United States Patent [19]
DePree

[11] 3,941,693
[45] Mar. 2, 1976

[54] SOLID MINERAL AND REGENERANT RECOVERY FOR ION-EXCHANGE RESINS

[75] Inventor: David O. DePree, Loomis, Calif.
[73] Assignee: Aerojet-General Corporation, El Monte, Calif.
[22] Filed: Aug. 12, 1974
[21] Appl. No.: 496,619

[52] U.S. Cl. ................................................ 210/34
[51] Int. Cl.² ......................................... B01D 15/06
[58] Field of Search ............ 210/24, 26, 28, 29, 30, 210/31 R, 32, 34, 269

[56] References Cited
UNITED STATES PATENTS

| | | | |
|---|---|---|---|
| 2,776,258 | 1/1957 | Gilliland | 210/34 |
| 3,062,739 | 11/1962 | Crits | 210/24 |
| 3,173,862 | 3/1965 | Clements et al. | 210/24 |
| 3,700,592 | 10/1972 | DePree | 210/34 |

Primary Examiner—Charles N. Hart
Assistant Examiner—Ivars Cintins
Attorney, Agent, or Firm—Edward O. Ansell

[57] ABSTRACT

Recovery of ion-exchange regenerants and precipitation of mineral salts is disclosed. The spent cation and anion regenerant streams are combined to form a weak dissociable complex of the regenerants and to reconstitute the removed inorganic mineral salt. The mixture is adjusted stoichiometrically to balance the anion and cation of the removed salt. The salt is precipitated by limiting solubility thereof either by concentrating the mixture or by reducing the solubility of the salts therein, suitably by the addition of a water-miscible solvent such as methanol. The complex is dissociated to reconstitute the separate anion and cation regenerants which are adjusted to the appropriate solvent concentration for recycle and reuse. Excess water in the system provided by water of hydration released by the resin during regeneration or by washing steps is removed prior, during or after separation of the regenerants depending on the nature of the separation technique employed and the optimum time for precipitation and removal of the mineral salts. Separation and recovery of the regenerants may be accomplished by distillation of regenerants having disparate volatilities, solvent extraction using an immiscible solvent having preferential solubility for one of the regenerants or by forming an insoluble complex of one of the regenerants. The recovered regenerants are reused as regenerants for spent anion and cation resin columns and the precipitated slats are removed by filtration, sedimentation or centrifugation.

23 Claims, 9 Drawing Figures

SOLID MINERAL AND REGENERANT RECOVERY FOR ION-EXCHANGE RESINS

BACKGROUND OF THE INVENTION

1. Field of the Invention

The present invention relates to the removal of mineral pollutants from water and, more particularly, to an improved method for recovery of spent regenerants and removal of mineral salts therefrom.

2. Description of the Prior Art

Water is becoming an increasingly scarce natural resource and with increasing population and industrial and commercial use of water, ionic pollution in the form of waste and by-product streams from industrial plants, refineries and municipal sewage is having a drastic effect on the ecological balance of lakes, rivers streams and even the oceans. Ionic pollution is found to destroy the food chain of marine life and in some cases so upsets the biological balance as to cause hazards to swimmers and fishermen. Even low ionic pollution in irrigation waters can have a drastic effect in terms of the accumulation of salts in the soil over extended periods of time. One of the main concerns of the present invention is to provide a method for demineralizing industrial and other waste streams prior to discharge into surface waterways. Water can be demineralized by many processes such as distillation, reverse osmosis, chemical precipitation or ion exchange. These processes, though all practiced commercially, suffer from limitations such as scaling, poor economics, and excessively high total dissolved solids (TDS) in the effluent, or the production of ecologically undesirable waste streams such as concentrated brines which are both expensive and difficult to dispose.

Since the development of commercially practicable synthetic ion-exchange resins, ion-exchange techniques have been the preferred methods for demineralizing water because of the high purity water produced, i.e., low TDS. However, the chemical costs for these systems have been quite high per unit of various salts removed. The ion-exchange method which conventionally has been used consisted of the use of beds of strong acid cation exchanger in the hydrogen form. The resin must be regenerated with a strong acid or strong base, depending upon the nature of the chosen resin. In these prior art systems, regeneration requires a considerable excess of regenerant and the original reaction does not proceed to completion, even though the regeneration may.

Deionization processes employing weak acid and weak base resins are per se known to the art. Two very real advantages in using these weak resins are the achievement of very high regeneration efficiencies, and a high theoretical loading capacity. Both types of weak exchangers can easily and effectively be regenerated to high levels by employing amounts of regenerant only slightly in excess of stoichiometry.

An improved process for the removal of mineral pollutants from water is disclosed and claimed in U.S. Pat. No. 3,700,592 issued on Oct. 24, 1972. This process comprises the following steps:

A. Passage of the aqueous mineral solution through weakly acidic cationic resin and weakly basic anion resin contained in a mixed bed to remove the mineral salts and provide a salt-free product stream.

B. Separation of the spent cationic and anionic resins.

C. Regeneration of the cationic resin with a solution of a chelating agent.

D. Regeneration of the anionic resin with an organic solution of a base.

E. Contacting the cationic regenerant stream (metal chelate solution) with carbon dioxide to precipitate metal carbonates and recover the cationic regenerant for recycle.

F. Contacting the above metal carbonates with the anionic regenerant stream (organic solution of amine salts) at elevated temperatures to precipitate metal salts and recover carbon dioxide and the amine regenerant for recycle.

The above-described process requires that the two regenerant streams are separated during the salt precipitation step. Furthermore, the mineral salts are separately recovered as metal carbonates from the cation regenerant stream and as a metal salt from the anion regenerant stream and the process is unnecessarily complex.

SUMMARY OF THE INVENTION

A basic spent cation regenerant is combined with an acidic spent anion regenerant to form a weak dissociable complex of the regenerants and to reconstitute the mineral salt. The spent cation and anion regenerants are combined either in a continuous or batch fashion by blending near stoichiometric quantities of the materials. This stoichiometric adjustment is based on the amount of the two streams necessary to reconstitute the mineral salts to be removed from the ion-exchange resins. The regenerant streams may be either aqueous solutions or organic solvent water solutions. In either case, the regenerant streams are diluted by the amount of water of solvation released by the resin during regeneration and possibly by washes of the resin beds. This additional water is removed prior, during or after separation of the regenerants depending on the nature of the separation technique employed and the best time for precipitation and removal of the salts.

Separation and recovery of the free-base forms of the regenerants may be accomplished by a physical separation technique such as one of the following:

1. Distillation of a more volatile regenerant from a relatively non-volatile regenerant;

2. Solvent extraction using an immiscible solvent having preferential solubility for one and of the regenerants; or 3. By forming an insoluble complex of one of the regenerants.

The recovered regenerants are adjusted in concentration and recycled to regenerate the spent anion and cation resins and the precipitated mineral salts are separated by filtration, sedimentation or centrifugation.

The instant process minimizes expenditures for chemicals by recycling all reagents required in the process and by otherwise limiting reagent loses. The process is with minimum modifications adaptable to the treatment of a wide variety of mineral containing streams and particularly to brackish water and tertiary waste streams from sewage plants. A further advantage of the instant process is that it is compatible with state of the art regeneration techniques.

The unique and flexible system of the invention will cleanse source water in unlimited quantity and will eliminate brine disposal if used in conjunction with specialized regeneration techniques now available. The instant systems can reduce the mineral content of the irrigation waters to prevent the loss of soil productivity and remove nitrates, phosphates and other ions which can foster algae growth. The systems can aid in the recovery of valuable minerals from manufacturing waste water, provide economical methods for tertiary treatment of waste water and have broad application in brackish water conversion. It can thus open up vast new sources of water that without economical proper treatment would be unusable or unfit for general use. Since these systems provide economies in waste water tertiary treatment to remove dissolved, inorganic solids, they make possible the recycling of this water supply or reinjection of the treated water into ground reservoirs without lowering the overall water quality.

These and many other attendant advantages of the invention will become apparent as the invention becomes better understood by reference to the following detailed description when considered in conjunction with the accompanying drawings.

DESCRIPTION OF THE PREFERRED EMBODIMENTS

Figure 1:
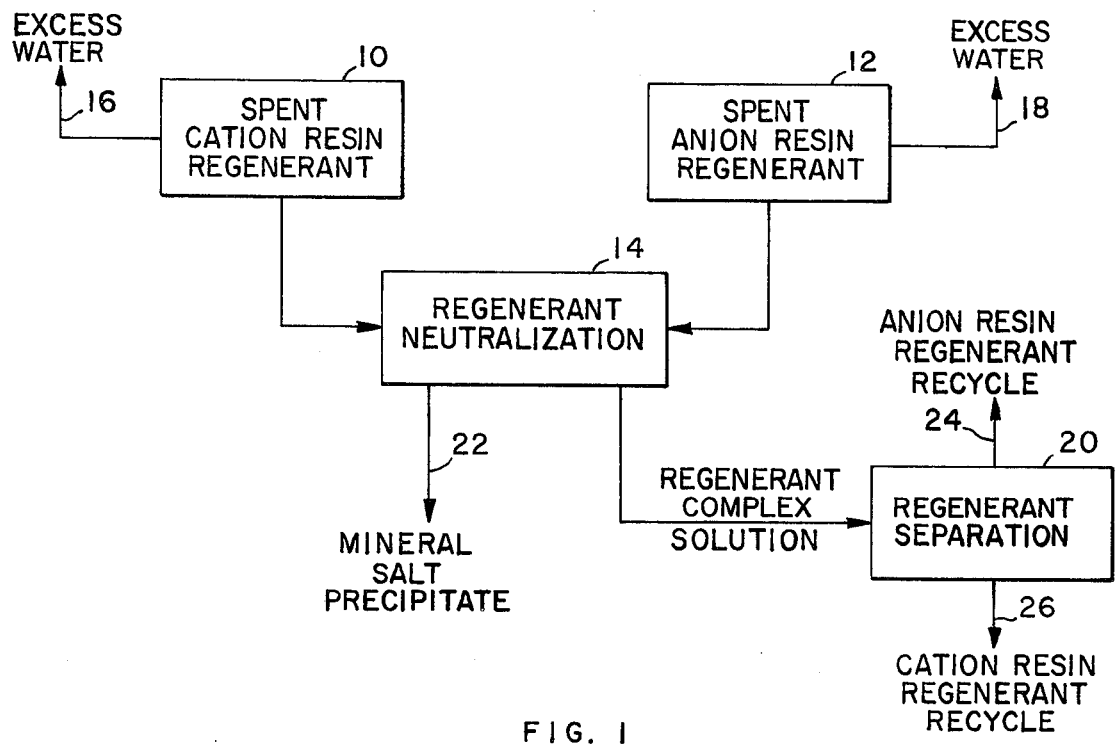
FIG. 1 is a block diagrammatic process flowsheet of the recovery process of the invention.

Referring now to FIG. 1, the invention in its most general aspects includes the combination of spent cation regenerant 10 with spent anion regenerant 12 in a vessel 14 in which the cation M from the cation regenerant $MR_c$ combines with the anion X from the spent anion regenerant $R_aX$ to form a weak dissociable complex $R_aR_c$ and to reconstitute the salt, MX. The salt plex $R_aR_c$ and to reconstitute the salt, MX. The salt MX may be in solution depending on the water content of the neutralization mixture and precipitates on removal of this excess water from the system.

The excess water may be removed from the spent cation regenerant 10 at 16 and/or from the spent anion regenerant 12 at 18 before combination of the regenerants from the regenerant neutralization vessel 14 or from the separation phase 20. Salt precipitation will occur at the point at which the excess water is removed from the system. The salt is suitably removed through line 22 when the spent regenerants are separately dewatered.

The spent regenerant complex $R_cR_a$ is then delivered to separation phase 20 in which the spent regenerants are separated into anion resin regenerant ($R_a$) stream 24 and cation resin regenerant ($R_c$) stream 26 which are recycled to the spent anion and cation beds, respectively for regeneration.

The process of the invention is preferably utilized in the purification of aqueous streams by the use of weak or moderately strong cation exchange and anion exchange resins. The resin beds may be mixed as disclosed in U.S. Pat. No. 3,700,592 or may be separate as disclosed in copending application Ser. No. 476,835, filed June 6, 1974.

The separation technique to be employed depends on the specific ion exchange resins, the regenerants used to regenerate the resins and the particular salts which are to be precipitated.

The high degree of efficiency required of the process for it to be economical requires that not only the resin regenerations be essentially quantitative but that the separation and recovery of the regenerants be highly efficient. To achieve this separation it is necessary that the complex formed between the cation regenerant and the anion regenerant be sufficiently dissociated to provide enough of the anion regenerant for its rapid removal by distillation, complexation or solvent extraction. This separation becomes progressively more difficult as the acid concentration in the pot increases due to amine removal. Four requirements must thus be met by the regenerants: (1) the pK of the cation and anion regenerants must be low enough to assure quantitative regeneration of the respective spent ion-exchange resins, (2) the pK of these regenerants must be high enough to provide adequate dissociation of their complex to permit ease of separation, (3) the regenerant heel remaining in the regenerant mixture after separation must not significantly interfere with the regeneration of the other resin bed or remain deposited on this resin bed after regeneration and (4) the regenerant to be separated must be stable to the separation media and must be stable under the conditions of the separation step. The pK of the regenerant will generally be between 3 and 6, preferably 5-7. Regeneration efficiency is related to the type of ion-exchange resin to be regenerated and the primary process of demineralization. The regenerant recovery process of the invention is generally adaptable to spent regenerant streams from separate or mixed beds of buffered or unbuffered weakly acidic cation exchange resins and weakly basic anion exchange resins such as those disclosed in U.S. Pat. No. 3,700,582 and in U.S. patent application Ser. Nos. 476,835 and 476,966, filed June 6, 1974. The term pK is utilized in the context as defined in the Condensed Chemical Dictionary, 8th Edition, Van Nostrand Reinhold Company, C 1971, at page 698.

The process is applicable to removal of water soluble inorganic salts from water, mainly halides, sulphates, sulfites, phosphates, phosphites, carbonates, bicarbonates, nitrites and nitrates of such metals as K, Na, Ca, Ba, Mg, Sn, Fe, Cu, Zn, Al, V, Cr, Mn and others. Excellent results are obtained with the Group IA and IIA alkali and alkaline earth metals, the most naturally occurring impurities since these are difficult to remove by nonbuffered processes. The process in both embodiments will also work on saline feeds containing mixtures of anions and/or cations.

The pK of the resins, both cationic and anionic should fall between about 3 and about 7. The resins are used in particulate bead form and may be large beads in the size range of 20-50 mesh or larger or small beads in the range of 40–80 mesh or smaller.

The weak cation-exchange resins which are particularly useful in the practice of this invention are those which contain carboxylic acid groups. These resins can conveniently be obtained by the copolymerization of compounds such as acrylic acid, methacrylic acid, acrylic esters, methacrylic esters, acrylonitrile or methacrylonitrile, and other unsaturated acrylates or nitriles with appropriate cross-linking agents such as divinylbenzene. If the resins are formed, however, from the polymerization of compounds containing ester or nitrile groups, hydrolysis to the corresponding acid must be effected prior to buffer addition. Further illustrations to the resins useful in the practice of the present invention and of methods for their preparation may be found by reference to U.S. Pat. Nos. 2,340,111; 2,371,818; 2,597,437; 2,885,371 and 2,963,453. In addition to the above-mentioned ionexchange resins, other weak-acid resins may be used. These resins may include those containing phosphonous, phosphonic, phosphinic or phosphoric acid groups and those resins which are made from phenol-formaldehyde condensates which also contain carboxylic acid groupings. The ion-exchange resins preferred at this time are those which contain either acrylic or methacrylic acid functional groups.

Representative weak-acid resins are Amberlite IRC-50 (a carboxylic resin based on a methacrylic acid cross-linked copolymer) having a pK of 6.1, B10-Rex 63 (a moderately acidic phosphonic acid polystyrene type) of Biorad Corporation, Chelex-100 (a very weakly acidic, iminodiacetic acid polystyrene type), and Duolite CC-3 (a polyacrylic acid having a pK of 5.57) of Diamond Shamrock Corp. Duolite CC-3 is favored due to high loading.

Weak "base" ion-exchange resins are generally resins having primary amine, secondary amine or tertiary amine as the principal functional group. Typically the weak base polyamines are copolymers of acrylonitrile and methyl acrylate cross-linked with divinylbenzene and then subjected to aminolysis with polyamines; copolymers of styrene-divinylbenzene chloromethylates treated with primary or secondary amines; and reaction products of phenolformaldehyde with a polyalkyleneamine. A weakly basic anion exchange resin may be defined as one which on titration with hydrochloric acid in water free from electrolytes has a pH below 7 when the amount of hydrochloric acid added is one-half the amount required to reach the inflection point (equivalence point).

Representative resins are set forth in Table I below.

Table I

| Anionic Resins | Composition | pK |
|---|---|---|
| ES-340 (Diamond Shamrock) | 85% Amine Functionality, 15% Quaternary, Amine/Epoxy Polymer Matrix, Gel Type | 6.49 |
| Dowex FDS-4024L (Dow Chemical) | Benzyl Dimethyl Amine Active Groups, Macroporous | 6.81 |
| Amberlite IRA-68 (Rhom & Haas) | Tertiary Amine Active Groups, Crosslinked Acrylic Matrix, Gel Type | 5.82 |
| Amberlite IRA-94 | Amine Functional Groups | 6.77 |

Table I-continued

| Anionic Resins | Composition | pK |
|---|---|---|
| (Rhom & Haas) | Styrene-Divinylbenzene Matrix, Macroporous | |

Even though ES-340 and FDS-4024L have similar basicities, the former is preferred due to its capability of achieving rapid equilibration during deionization and loading in the range of 25–30%. IRA-68 is the most preferred due to the lack of quaternary amine functional groups.

The regeneration process proceeds through the following steps:

Cation Resin Regeneration     Anion Resin Regeneration
I    $M(AC) + R_cH \rightarrow H(AC) + MR_c$    II    $AN\;HX + R_a \rightarrow R_aX + (AN)HOH$ Combination
III    $MR_c + R_aX \rightarrow MX + R_cR_a \rightarrow MX\downarrow + R_c + R_a$ where:
$H(AC)$ = Cation Resin, H Form
$MX$ = Inorganic salt; M = cation, X = anion
$AN(HOH)$ = Anion Resin, OH Form
$MAC$ = metal cation loaded cation resin
$AN\;HX$ = Anion loaded anion resin
$R_c$ = Cation regenerant
$R_a$ = Anion regenerant
$R_cR_a$ = Dissociable complex In steps I and II, the spent resins are regenerated to displace the metal cation M and anion X to essentially quantitatively regenerate the resins to the acid and base forms yielding a metal salt $MR_c$ of cation regenerant and a salt $R_aX$ of the anion regenerant. In step III the two salts in essentially stoichiometric amounts are combined to reconstitute the removed salt MX and to form the dissociable complex of the regenerants $R_cR_a$.

The anion regenerant according to the invention is an organic base. Among the organic bases, the amines (substituted and unsubstituted) are particularly suitable herein as anion regenerants. These amines may be selected from compounds of the formula:

$$R_2-\underset{\underset{R_3}{|}}{\overset{\overset{R_1}{|}}{N}}$$

where $R_1$, $R_2$ and $R_3$ are selected from hydrogen, alkyl, alkynyl, alkenyl, aryl, alkaryl, aralkyl, alkoxy and may be substituted with hetero atoms or groups such as hydroxyl, ether, halogen, cyano; or $R_2$ and $R_3$ may be linked to form a cycloaliphatic structure. The molecular weight of the amine is preferably maintained below about 500 and preferably below 200 to avoid extensive swelling and deterioration of the resin particles. Preferred anion regenerants have a pK in water at 25°C of 5 to 7. The pK of the regenerant is a compromise between the ability to regenerate and the ability to separate the regenerants. As the basicity decreases, the ability to regenerate decreases but the separation from the cation regenerant is facilitated.

Representative amine anion regenerants are N,N-dimethylethylamine, trimethylamine (TMA), dimethylamine, pyridine, N-methyl-morpholine, N,N-dimethyl-2-methoxyethyl amine, isopropanol amine, tri-n-octyl amine, tri-n-decyl amine, N,N-diethylmethyl amine, triethylamine, dimethylethanolamine and the like.

Higher pK organic bases such as trimethylamine provide better separation from the cation regenerant. The regenerant should be at least one order of magnitude in pK more basic than the anion resin for efficient regeneration.

The anion regenerant is generally provided in at least a 30% stoichiometric excess with respect to the anion loading level of the column, generally a 50 to 200% excess. Regeneration need not proceed to completion but may be 60% or more depending on requirements of the primary demineralization step. The regenerant steam may be water or organic solvent based such as an alcohol, suitably methanol. The water content must be at least 5%, preferably at least 10%, to allow efficient removal of anions while preventing collapse of the resin due to dehydration.

Fifteen anion regeneration cycles of chloride loaded ES-340 were conducted in a pilot plant with dimethylethanolamine (DMEA), dimethylethylamine (DMA) and trimethylamine (TMA) and sodium hydroxide in excesses ranging from 22% to 226% and concentrations ranging from 1N to 4N. The anion loading and residual anion loading are stated in gram equivalents (g-eq). The direction of flow is identified as bottom to top (B-T) or top to bottom (T-B) and the regenerant flow in gallons per hour (GPH). The anion resin in each case was ES-340. The results are presented in the following table.

theless, IRA-68 is quantitatively regenerated with TMA when as little as 50% excess amine is utilized as shown in the following table.

TABLE 2

REGENERATION OF AMBERLITE IRA-68 ANION EXCHANGE RESIN WITH TRIMETHYLAMINE

| Type of Loading | Loading Level % of Theory | Regeneration, % | TMA Solution Concentration | TMA Excess, % |
|---|---|---|---|---|
| NH$_4$Cl Solution (Simulating run conditions) | 46.5 | 98.5 | 3.15 N | 50 |
| NH$_4$Cl Solution | 27.2 | 100 | 2.0 N | 100 |

The more efficient regeneration is attributable to the presence of approximately 15% quaternary amine sites in the ES-340 resin and absence of quaternary amine sites in IRA-68. Furthermore, the greater penetration of organic soluble amines such as TMA into the resin matrix provides for more rapid equilibration during regeneration.

The cation resin regenerants are metal complexing agents and weakly acidic carboxylic acids which form weak, strongly dissociated complexes with the anion resin regenerant. The complexing agents are chelating agents and preferably those which are soluble in an appropriate organic liquid and which preferentially form organic-soluble chelates with specific metal ions. Selectivity of preferred chelates toward specific metal ions is attained primarily by adjusting the steric effects displayed by the chelating agent. Steric effects may be varied by proper choice of substituent groups.

Examples of monomeric chelating agents useful in our process include diketones, esters, amides, nitrocompounds, amines, amine acids, hydroxyl compounds and combinations of compounds containing these structures which are capable of enol formation and cyclization with metal ions to form chelates. Preferred chelating agents include nitrodiphenylamines and β-

TABLE I

ANION REGENERATION RESULTS - PILOT PLANT

| Run No. | Resin Column No. | Regen. Used | Regen. Conc. Normal | Regen. Excess % | g-eq. Anion Loaded | Eff. of Regen. % | Direction of Reg. Flow | Approx. Regen. Flow GPH | g-eq Anion Left on Bed |
|---|---|---|---|---|---|---|---|---|---|
| 1 | 3 | DMA | 2 | 116 | 9.7 | 49 | B-T | 1.8 {air inclusion in resin} | 4.9 |
| 2 | 6 | DMA | 2 | 116 | 9.7 | 61 | B-T | 4.3 | 3.8 |
| 3 | 6 | DMA | 2 | 68 | 12.5 | 52 | B-T | 2.0 | 6.0 |
| 4 | 3 | NaOH | 1 | 46 | 7.9 | 100 | B-T | 2.1 | 0.0 |
| 5 | 6 | NaOH | 1 | 105 | 5.6 | 95 | B-T | 2.2 | 0.3 |
| 6 | 3 | DMA | 2 | 106 | 10.7 | 70 | T-B | 2.7 | 3.2 |
| 7 | 6 | TMA | 2 | 47 | 9.2 | 60 | T-B | 1.8 | 3.7 |
| 8 | 3 | TMA | 2 | 216 | 9.5 | 69 | T-B | 2.2 | 3.0 |
| 9 | 6 | TMA | 2 | 226 | 9.2 | 64 | T-B | 2.0 | 3.3 |
| 10 | 3 | TMA | 1 | 126 | 9.5 | 67 | T-B | 1.8 {incl. overnight soak} | 3.1 |
| 11 | 6 | TMA | 4 | 361 | 9.0 | 67 | T-B | 1.7 | 3.0 |
| 12 | 3 | TMA | 2 | 90 | 10.5 | 56 | B-T | 1.6 | 4.6 |
| 13 | 6 | DMEA | 2 | 157 | 7.4 | 39 | B-T | 2.7 | 4.5 |
| 14 | 3 | NaOH | 1 | 168 | 3.7 | 100 | B-T | 2.5 | 0.0 |
| 15 | 6 | NaOH | 1 | 22 | 8.1 | 100 | B-T | 2.3 | 0.0 |

It is seen that DMA and TMA perform equally well and much better than DMEA which has a higher pK. Top to bottom regenerant flow appeared to be somewhat superior to bottom to top flow. More efficient regeneration occurs when at least 100% excess amine is utilized.

Amberlite IRA-68 resin (pK = 5.8) has an average basicity greater than ES-340 resin (pK = 6.8). Neverdiketones. Particularly useful in our process are various sterically hindered β-diketones including those having a single exchangeable hydrogen. Specific examples of β-diketones having a single exchangeable hydrogen include the substituted cyclohexanones such as 2-acetylcyclohexanone.

In the case of a weakly acidic cation exchange resin loaded with calcium or magnesium ions, the β-diketone may be a cycloaliphatic diketone such as 1,3-cyclohexanedione and its derivatives as disclosed in U.S. Pat. No. 3,658,729. Although the above complexing agents are extremely effective regenerants for cation exchange resins, they suffer to some extent from loss through dimerization under alkaline conditions especially at elevated temperatures such as encountered in the distillation recovery steps of the present process. This is because both the hydrogen form and the anionic form of the chelating agent are present in the regenerant solution. Consequently, loss of regenerant takes place during the regenerant recovery cycle. It has been found that substituted cycloaliphatic β-diketones undergo little or no dimerization under the same regenerant recovery conditions.

When, for example, 1,3-cyclohexanedione is partially neutralized with a base and then the water solution heated, the following dimerization reaction occurs. A mechanism for this equation is shown in the following equation.

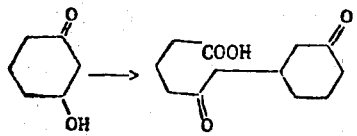

The experiments described in the following example demonstrate that little if any dimerization occurs when the free acid is heated in water solution or that little if any dimerization occurs when all of the ligand is in the salt form. These experiments show, however, that when the mixture of the free ligand and amine or alkali metal chelate is heated in water solution a significant amount of dimerization occurs.

EXAMPLE 1

A total of 50 ml water solution of 1,3-cyclohexanedione were prepared. 1,3-cyclohexanedione (a) in the free state, (b) totally converted to the sodium chelate, (c) approximately half as the sodium chelate and (d) half as the N,N-dimethylethylamine salt. The solutions were stored at 65°C in a constant temperature bath for 4½ hours and analyzed initially, after 1.5 hours and after 4.5 hours for 1,3-cyclohexanedione and its salt by acid/base titrimetry. The dimer formed by degradation of the material is monofunctional, hence a reduction in total titration, in fact in free ligand indicates the formation of dimer.

The analytical results obtained were as follows:

TABLE 3

| Sample Number | Free Ligand, equiv. | Initial Na Chelate, equiv. | Amine Salt, equiv. |
|---|---|---|---|
| (a) | 0.040 | — | — |
| (b) | — | 0.044 | — |
| (c) | 0.024 | 0.020 | — |
| (d) | 0.021 | — | 0.025 |
| *After 1.5 Hours at 65°C* | | | |
| (a) | 0.040 | — | — |
| (b) | — | 0.0438 | — |
| (c) | 0.0217 | 0.020 | — |
| (d) | 0.020 | — | 0.023 |
| *After 4.5 Hours at 65°C* | | | |
| (a) | 0.0398 | — | — |
| (b) | — | 0.0438 | — |
| (c) | 0.0162 | Not Analyzed | — |
| (d) | 0.0165 | — | 0.0223 |

Sterically hindered derivatives of 1,3-cyclohexanedione have been discovered which are not prone to the dimerization reaction. Substitution with aliphatic groups even in the 5 position inhibits the reaction while substitution in the 2 position, the site of the dimerization link, is particularly effective. The data presented in the following examples clearly demonstrates this inhibition of the side reaction.

EXAMPLE 2

Water solutions of three sterically hindered derivatives of 1,3-cyclohexanedione combined with their salts were subjected to 4½ hours of storage at 65°C. Within the limits of experimental accuracy no formation of dimer could be detected. The solutions stored were the following:

a. 5,5-dimethyl-1,3-cyclohexanedione in combination with its sodium salt.
b. 5,5-dimethyl-1,3-cyclohexanedione in combination with its N,N-dimethylethylamine salt.
c. 2,2'-methylenebis, 1,3-cyclohexanedione in combination with its sodium salt.
d. 2-methyl-1,3-cyclohexanedione in combination with its sodium salt.

Again, as in previous Example 2, dimer formation was assessed as a loss in free ligand as determined by titrimetry. The data obtained were as follows:

TABLE 4

| | Total Composition, Equivalents | | | | | | | |
|---|---|---|---|---|---|---|---|---|
| | (a) | | (b) | | (c) | | (d) | |
| Storage Time, hr. | Ligand | Na Salt | Ligand | Amine Salt | Ligand | Na Salt | Ligand[1] | Na Salt |
| 0 | 0.0100 | 0.0084 | 0.0135 | 0.0210 | 0.0040 | 0.0032 | 0.0020 | 0.023 |
| 1.5 | 0.0100 | — | 0.0131 | — | 0.0040 | — | — | — |
| 4.5 | 0.0102 | — | 0.0131 | — | 0.0038 | — | 0.0020[2] | 0.023[2] |

[1]Concentration limited by insolubility of free ligand.
[2]Concentration after 3 hours storage at 65°C.

Substitution of 1,3-cyclohexanedione hindering groups does not adversely affect the capability of the compound to regenerate cation exchange resins. However, the nature of the substituent has a significant influence on both the water and/or methanol solubility of the regenerant and hence it is desirable to substitute with such polar groups as ethers, nitriles and the like in order to provide optimum solubility to achieve high concentrations of regenerant.

The preferred recoverable carboxylic acid cation resin regenerants are hydroxy or alkoxy substituted alkanoic acids of the formula:

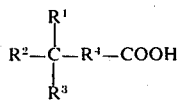

where $R^1$, $R^2$ and $R^3$ may be any of —H, —OH, —$(CH_2)_nCH_3$, —$O(CH_2)_n$—, $CH_2R^5$, —$O[(CH_2)_qO]_m CH_2R^5$ where $n$ is an integer from 0 to 5, $m$ is an integer from 1 to 3, $q$ is an integer from 1 to 3 and $R^5$ is —H or —OH; provided at least one of $R^1$, $R^2$ and $R^3$ contain at least one —C—O—C— or —C—OH moiety. $R^4$ is a divalent aliphatic hydrocarbon bridge containing 0–4 carbon atoms. The regenerants are disclosed in more detail and are claimed in U.S. patent application Ser. No. 496,482, filed concurrently herewith, the disclosure of which is incorporated herein by reference.

The hydroxyl or alkoxyl substituents provide high solubility for the parent acid and its cationic salts, particularly such as alkaline earth metal ions as calcium and magnesium. These substituents also insure that the acid is high boiling and demonstrates non-azeotropic behavior for ease of separation from the anion regenerant such as a tertiary amine. The weak complexing ability of these acids can be a positive factor in enhancing cation removal.

Specific cation resin regenerants are α-hydroxy alkanoic acids of from 2–6 carbon chain length, β-hydroxy acids of from 2–6 carbon atom chain length and the methyl, ethyl and propyl ethers of the above acids. Representative acids are α-lactic acid, β-lactic acid, β-methoxypropionic acid (MOPA) and 4,7-dioxacaprylic acid (DOCA).

The regenerantion efficiency of several of these acids is illustrated by results of laboratory scale regeneration of both sodium and calcium loaded resins representing both the polyacrylic (Duolite CC-3) and polymethacrylic (Amberlite IRC-84) types using both water and methanol/water solutions as shown in the following table.

TABLE 5
REGENERATION OF CATION EXCHANGE RESINS WITH HYDROXYL OR ALKOXYL SUBSTITUTED CARBOXYLIC ACIDS.

| Regenerant | Conc. N | Excess % Over Theory | Solvent | Cation | Resin | Regen. % |
|---|---|---|---|---|---|---|
| α-Lactic Acid | 1.98 | 20 | $H_2O$ | $Na^+$ | Duolite CC3 | 94 |
| " | 1.39 | 100 | 15% $CH_3OH$/85%-$H_2O$ | $Na^+$ | Duolite CC3 | 90 |
| " | 1.46 | 100 | 15% $CH_3OH$/85%-$H_2O$ | $Ca^{++}$ | Duolite CC3 | 94 |
| β-Lactic Acid | 2.0N | 50 | $H_2O$ | $Ca^{++}$ | Amberlite IRC-84 | 84.5 |
| " | 1.03N | 100 | $H_2O$ | $Ca^{++}$ | Duolite CC3 | 96.2 |
| β-Methoxy Propionic Acid | 2.0N | 50 | $H_2O$ | $Na^+$ | Duolite CC3 | 100 |

The cation regenerant is preferably utilized in excess in order to achieve efficient regeneration. The excess is suitably at least 50% of the amount theoretically required and preferably at least 100% of the stoichiometric amount. Furthermore, these cation regenerants are capable of efficient regeneration even in the presence of anion regenerant residues and salt heels. In fact, as shown in the following table, relatively high concentrations of these residues have little effect on regeneration efficiency.

TABLE 6
EFFECT OF SALT AND AMINE REGENERANT HEELS ON REGENERATION EFFICIENCY OF HYDROXYL AND ALKOXYL SUBSTITUTED CARBOXYLIC ACIDS

| Cation Regenerant | Amine Heel, % of Cation Regenerant | Salt Heel % | Cation | Excess Cation Regenerant % | Regeneration % |
|---|---|---|---|---|---|
| α-Lactic Acid | Trimethyl Amine 12.5 | 0 | $Na^+$ | 50 | 91.9 |
| " | Trimethyl Amine 22.0 | 0 | $Na^+$ | 50 | 98.4 |
| " | Trimethyl Amine 24.5 | 0 | $Ca^{++}$ | 50 | 88.9 |
| " | Trimethyl Amine 32.3 | 0 | $Na^+$ | 50 | 97.6 |
| " | Trimethyl Amine 31.0 | 0 | $Ca^{++}$ | 50 | 85.0 |
| β-Lactic Acid | Trimethyl Amine 22.0 | 0 | $Na^+$ | 50 | 93.6 |
| " | Trimethyl Amine 20.2 | 7.7% NaCl | $Na^+$ | 50 | 87.7 |

Regeneration requirements in terms of stoichiometry, concentration and flow rates for regeneration of sodium, calcium, magnesium and their mixtures loaded onto Duolite CC-3 resin are presented in Table 7 below. Similar data for the regeneration of chloride, nitrate and sulfate loaded Amberlite IRA-68 is presented in Table 8 below.

TABLE 7

REGENERATION REQUIREMENTS FOR CATION RESINS
(LOADING LEVEL ~40% OF THEORY)

| CATION | CONC. LIMITS REGEN. SOLUTION, N | STOICHIOMETRY REGEN. CHARGE, % OF METAL LOADED | WASH REQ., (EST) BED VOLUMES |
|---|---|---|---|
| $Na^+$ | 0.5 – 2 | 175[1] | 3[1] |
| $Ca^{++}$ | 0.5 – 1 | 300 (est.) | 3 |
| $Mg^{++}$ | 0.5 – 1 | 320 | 3 |
| $Na^+/Ca^{++}$ 60/40[2] | 0.5 – 1 | 315 | 3 |
| $Na^+/Mg^{++}$ 80/20[2] | 0.5 – 1 | 225 | 3 |

[1] Pilot Plant Data
[2] Ratio of Equivalents
Solution N = Solution Normality

TABLE 8

REGENERATION REQUIREMENTS FOR ANION RESINS
(LOADING LEVEL ~50% OF THEORY)

| ANION | CONC. LIMITS REGEN. SOLUTION, N | STOICHIOMETRY REGEN. CHARGE, % OF ANION LOADED | WASH REQ., (EST) BED VOLUMES |
|---|---|---|---|
| $Cl^-$ | 2 | 150 | 3 |
| $NO_3^-$ | 2 | 200 | 3 |
| $SO_4^{--}$ | 2 | 175 | 3 |
| $PO_4^{---}$ | 2 | 165 | 3 |

Figure 2:
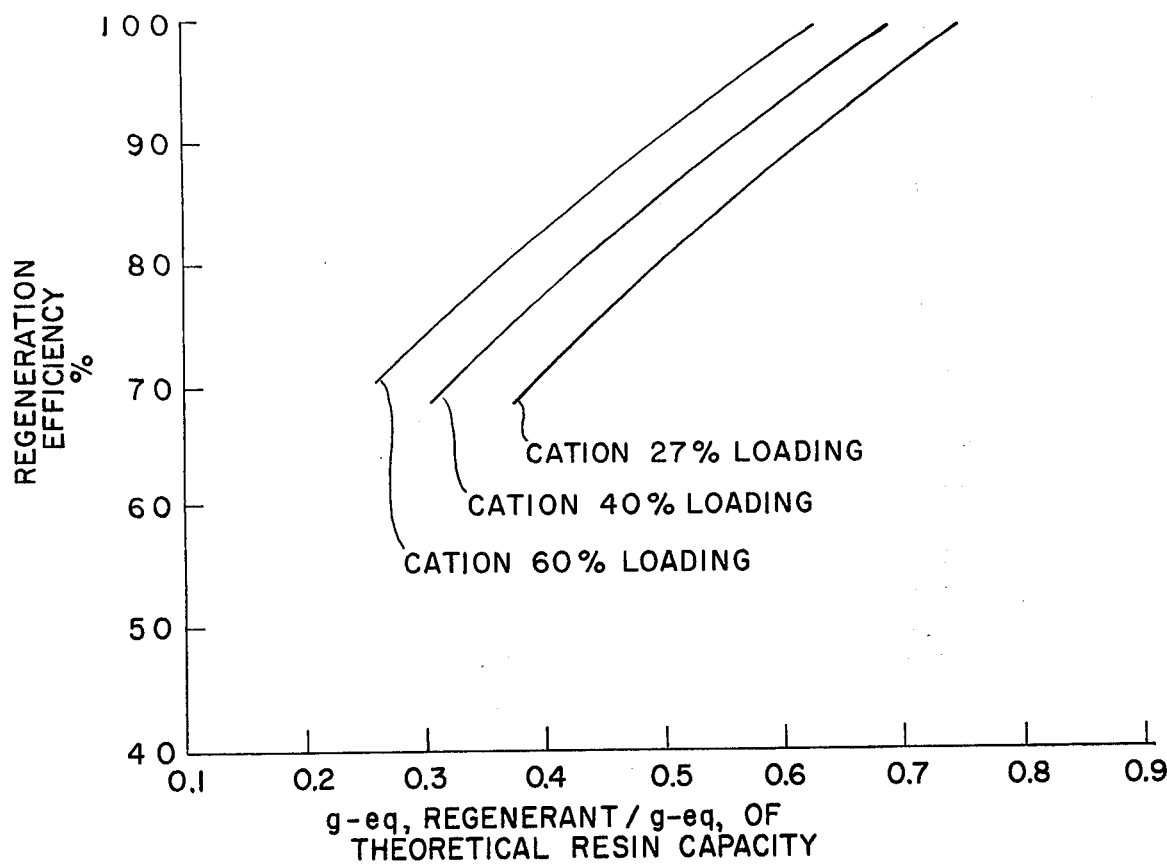
FIG. 2 is a graph illustrating the regeneration efficiency at 25°C of a N-methyl morpholine buffered CC-3 resin column with MOPA at different $Na^+$ loading levels.
Figure 3:
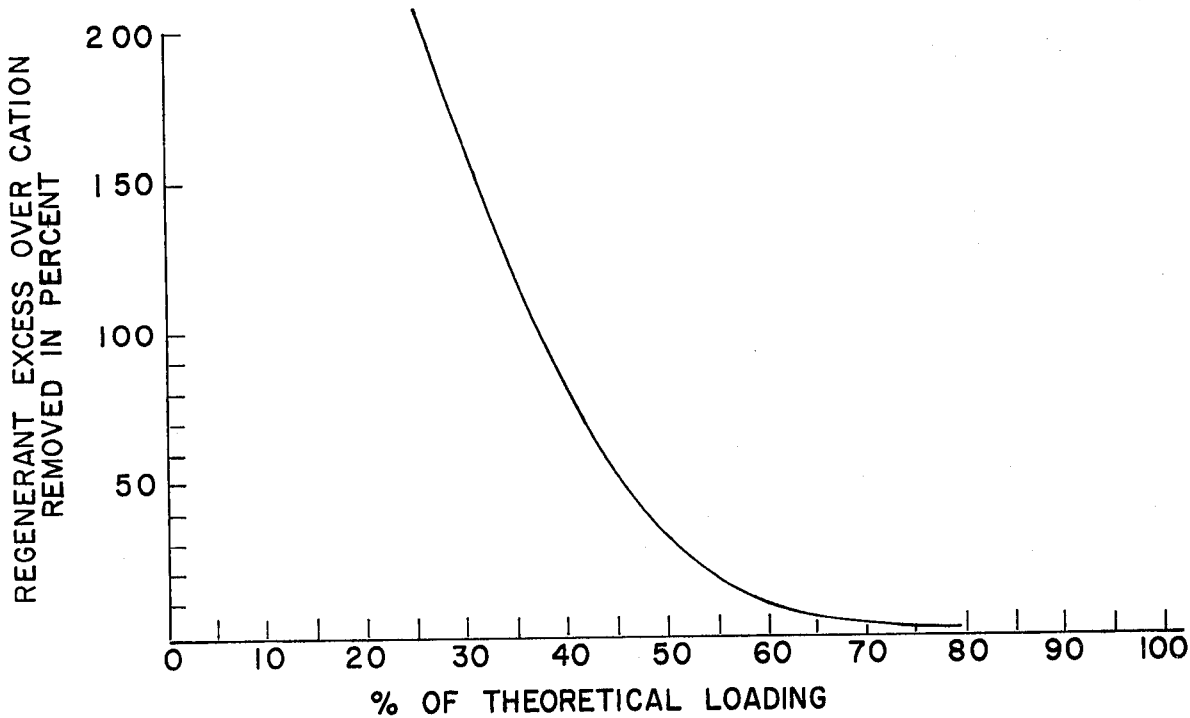
FIG. 3 is a graph illustrating the regeneration excess vs. cation resin loading at the time of regeneration for 100% CC-3 resin regenerated with MOPA.

The requirements for adequate regeneration of a sodium loaded, previously buffered CC-3 cation resin are contained in FIGS. 2–3. This data was obtained from pilot plant runs utilizing MOPA at 25°C as the regenerant. The data shows the effect of cation loading and excess regenerant on the efficiency or completeness of regeneration. For MOPA complete regeneration with a reasonable excess of acid requires a cation loading of 50% or higher.

As previously discussed, the choice of physical method of separating and recovering the regenerants influences the selection of regenerants. A more detailed description of particular separation techniques follows.

The removal from the neutralization mixture of one of the regenerants is dependent first on the dissociation of the complex formed between the two regenerants and the formation of an essentially non-dissociated complex with the complexing agent. It is found that when an INSOLUBLE COMPLEXING AGENT is employed to form an insoluble complex, this latter complex is little dissociated and hence the reaction to remove the regenerant is driven to an adequate degree of completion. A second requirement for this recovery is that the complex formed for the removal of regenerants must be destroyed by some means such as heat in order to recover the regenerant for use.

Separation of the regenerants at ambient conditions reduces the high temperature exposure of the regenerants and thus minimizes degradative side reactions such as oxidation, ester formation, amide formation, or dimerization which may occur on prolonged heating and which limit the types of regenerants which may be used. Although a complex of either the anion or cation regenerant could be used for the process from a practical standpoint, the anion regenerant such as the organic amines are more easily complexed and can most readily be removed. The properties of the complexing agent have a direct bearing on the efficiency of the process. In order to achieve efficient removal of one of complex which is essentially undissociated at ambient the regenerants, a complexing agent should provide a or low temperature. This is best achieved through the use of an insoluble complexing agent which in turn produces an insoluble complex, thus removing the regenerant from the ionizing medium. The use of volatile complexable regenerant, on the other hand, aids the recovery of the complexed regenerant for use. Thus, heat can be used to increase dissociation of the complex after isolation and the volatility permits the removal of the regenerant from the complexing agent. Preferred insoluble complexing agents are transition metal salts of water insoluble cross-linked polyacids. These acids are commercially available as cation-exchange resins and include polyacrylates, polymethacrylates, phosphonic acid and sulfuric acid substituted polystyrene based materials. The transition metals suitable for application to this process include copper, cobalt, chromium, iron and nickel, among others.

Strong polyacids provide complexes with the transition metal which are not subject to dissociation and therefore could form soluble amine complexes which interfere with the removal of the amine. Preferred acids are strong polyacids, such as Dowex-50, a polysulfuric acid on a polystyrene lattice. A typical example follows.

EXAMPLE 3

25 ml of water solution containing 5.7% (13.7 milliquivalents) of β-methoxypropionic acid and 3.5% (13.7 milliequivalents) of trimethylamine were treated with 20 ml of Dowex-50 resin (38 milliequivalents), 60% of the acid sites substituted with cupric ions. The resin was stirred for several hours and the supernatant liquid remained colorless. Analysis of the supernatent liquid and the resin after separation showed the resin to contain 4.2% copper and 7.16% trimethylamine. Essentially all of the trimethylamine had been removed from solution as indicated by the following analysis of the supernatant liquid.

| | |
|---|---|
| Cu++ | 1.3 ppm |
| TMA | 0.1 ppm |

Figure 4:
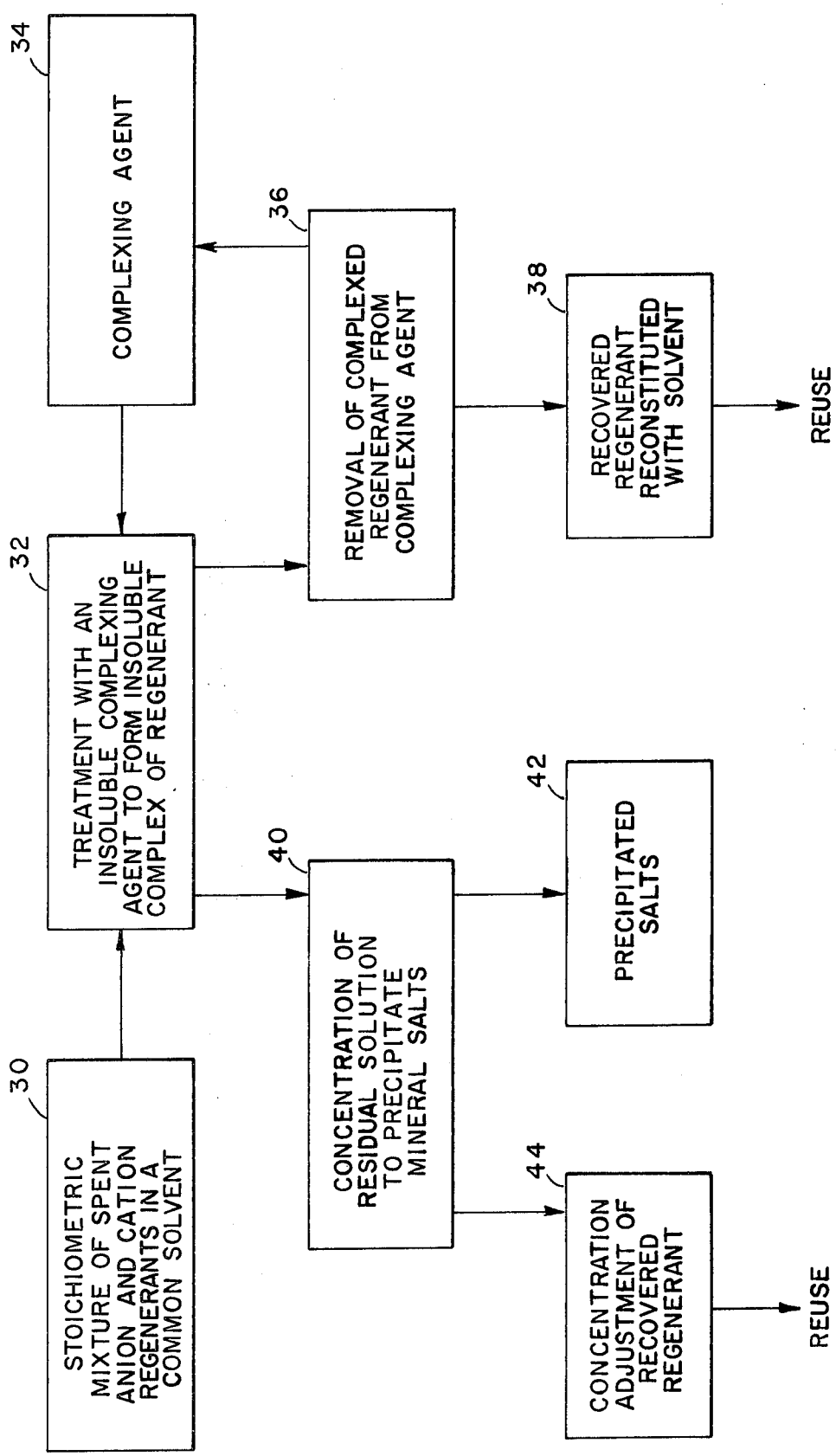
FIG. 4 is a block diagrammatic process flowsheet of the complexation recovery technique of the invention.

Referring now to FIG. 4, a simple flow diagram describing a complexing process is illustrated. The near stoichiometric neutralized mixture in a common solvent of the spent ion and cation regenerants in feed tank 30 contains the mineral ions removed from the cation and anion resins and a weak complex formed between the anion and cation resin regenerants. This mixture is then treated at 32 with an insoluble complexing agent from supply tank 34 to form an insoluble complex with on of the regenerants. The removal of this regenerant is dependent upon the presence of some free regenerant formed from the dissociation of the complex between the anion and cation resin regenerants and the insolubility and low dissociation of the second complex formed with insoluble complexing agent. Although a complex of either the anion or cation regenerant could be used for the process from a practical standpoint, the anion regenerants which are usually organic amines are more eadily complexed and can be most readily removed.

In the next step, the insoluble complex which was removed by some separatory method such as filtration or centrifugation is subjected to heating in vessel 36 to break down the complex into regenerant and complexing agent. The complexing agent is recycled to supply tank 34 while the recovered regenerant, usually an organic amine, is removed either by washing or distillation and its concentration adjusted with common solvent in supply tank 38 for recycle and reuse.

The residual solution in vessel 32 containing mineral ions and the non-complexible, non-volatile regenerant is concentrated either by atmospheric or vacuum distillation to remove solvent in concentrator 40. This causes excess mineral salts to precipitate which are removed by filtration or centrifugation in precipitator 42. The residual regenerant solution is delivered to tank 44 for adjustment with the common solvent to appropriate concentration for recycle and reuse.

It is readily apparent that the separation of the regenerants by complexation and subsequent recovery of the separated regenerants and precipitate mineral salts can be conducted either in a batch, semicontinuous or continuous manner, depending only on the nature of the particular equipment selected for conducting the process. It is also apparent that the nature of the common solvent because of the degree of dissociation of the anion/cation regenerant complex and its dependence on the nature of the solvent has a strong influence on the operation of the process. It is preferred both from the standpoint of economy and ease of operation that the common solvent be water, although other solvents such as alcohols may also be used.

The technique of separating cation and anion regenerants from each other by complexation is the subject matter of concurrently filed, copending application Ser. No. 496,484 filed Aug. 12, 1974, the disclosure of which is incorporated herein by reference.

Efficient separation of the regenerants by SOLVENT EXTRACTION can also be accomplished in accordance with the invention. The separation and removal of one regenerant from the other extraction of the near stoichiometric adjustment mixture with a non-miscible solvent is also dependent on the dissociation of the complex formed between the regenerants. This dissociation occurs readily between weak acids and weak bases under the higher temperature conditions attained during distillation. However, surprisingly it has also been found that sufficient dissociation also occurs at ambient temperature to permit ready extraction of a single component.

Separation at ambient conditions provides a significant advantage over high temperature conditions in that the degradative side reactions occurring at temperatures above the boiling point of water such as oxidation, ester formation, amide formation, or dimerization which limits the selection of regenerants for higher temperature applications are minimized and hence a wider variety of chemical structures are suitable as regenerants. A second significant advantage is that the organic amine anion regenerant need not be volatile and hence losses due to volatility or the abnoxious odors associated with volatile amines are minimized. The process is also emenable to continuous operation. Suitable amines are primary, secondary or tertiary amines such as trimethylamine, pyridine, N-methyl morpholine, isopropanolamine, N,N-dimethylethylamine. The cation regenerants may be those previously described.

Figure 5:
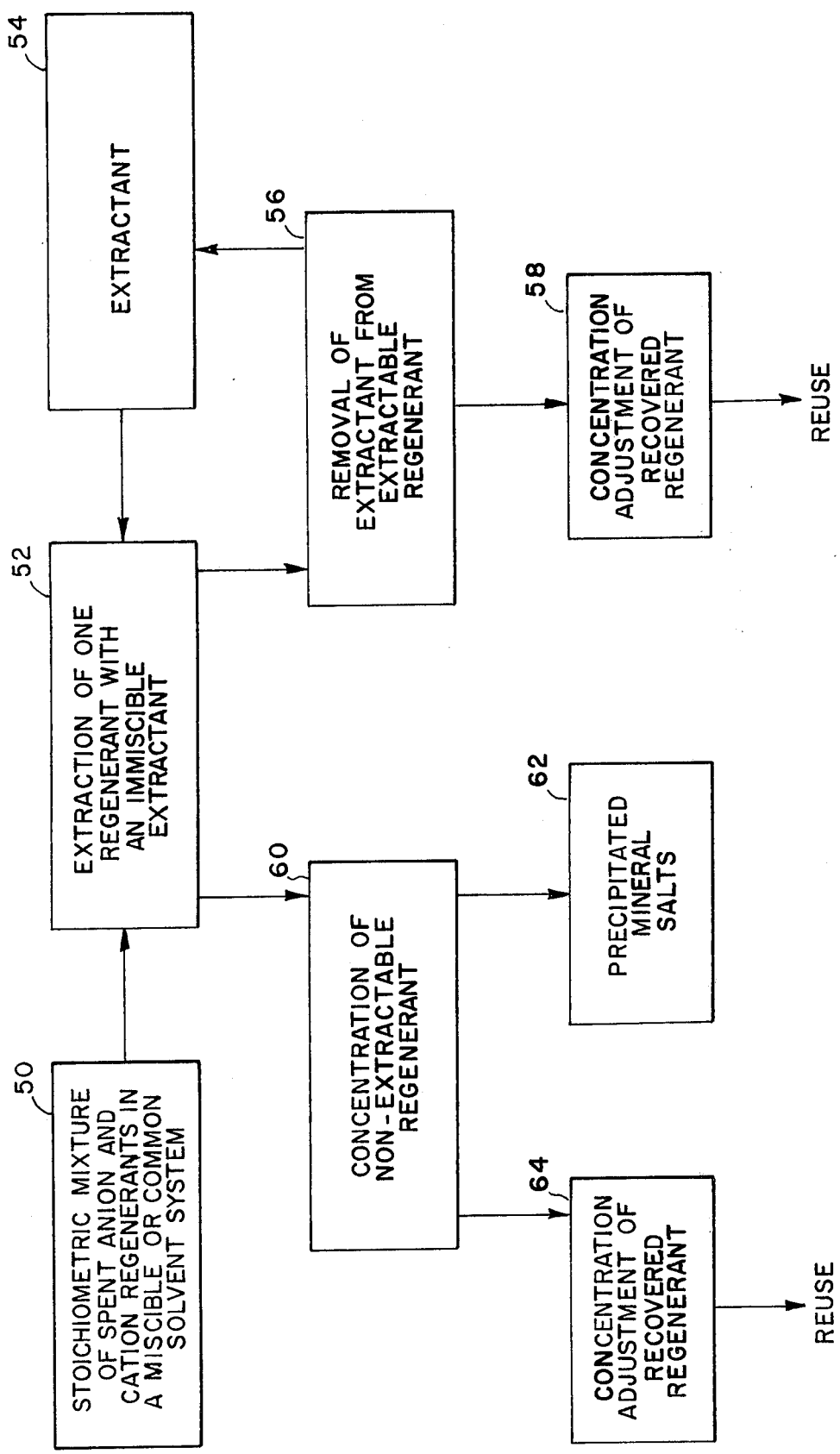
FIG. 5 is a block diagrammatic process flowsheet for the extraction recovery technique of the invention.

Referring now to FIG. 5, the near stoichiometric mixture of spent anion and cation resin regenerants in feed tank 50 in a common solvent is composed of the mineral ions removed and the regeneration of the cation and anion exchange resins and a weak complex formed between the two regenerants. The mixture is extracted in extraction tank 52 which receives a flow of extractant from tank 54. The common solvent may be water, alcohol or water/alcohol mixtures. The common solvent immiscible extractant has preferential solubility for only one of the regenerants. This extraction may be run continuously by means of heavy continuous liquid/liquid extraction apparatus or in a series of separate sequential batch extractions. The removal of one of the regenerants is dependent on both the partition coefficient of solubility for the regenerant between the solvent and the extractant and on the degree of dissociation of the complex between the anion and cation resin regenerants. The extractant solvent is removed from tank 52 and separated from the extracted regenerant in tank 56 for recycle to the extractant supply tank 54. The extractant regenerant is adjusted in concentration with miscible solvent in recycle tank 58 for reuse in the process. Removal of the extractant for recycle may be by any physical means such as distillation, either at atmosphere conditions or under reduced pressure.

The non-extracted regenerant remaining in tank 52 is concentrated in concentrator 60 by any physical means such as distillation and the mineral salts when they exceed their solubility in the common solvent precipitate and are removed by filtration, centrifugation or settling into tank 62. The residual regenerant is then delivered to tank 64 and adjusted in concentration for recycle.

The extractants may be aliphatic, alicyclic, or aromatic hydrocarbons containing 4–12 carbon atoms such as hexane, heptane, cyclohexane, toluene or benzene and halogenated derivatives thereof such as trichloroethylene. Other extractants include aliphatic or aromatic ethers such as diethylether or diphenyl oxide. Although it is possible to extract the cation regenerant, there are more readily available extractants which are good solvents for the amine regenerants and which are non-solvent for the cation regenerants and hence they are preferred in the practice of this embodiment. Examples of practice follow. Additional extractants include diphenyl oxide, diethly ether, toluene and heptane.

EXAMPLE 4

β-methoxypropionic acid (cation resin regenerant) and trimethylamine (an anion resin regenerant) in approximately equimolar quantities in aqueous solution simulating a stoichiometric adjustment mixture, was subjected to extraction with two separate immiscible solvents, hexane and benzene. Extraction was effected by means of shaking equal quantities of the aqueous mixture with the extractant in separatory funnel, allowing the two immiscible phases to separate and then analyzing each of the phases for amine and acid regenerants by potentiometric titration with standardized hydrochloric acid solution and then with standardized sodium hydroxide solution. In a like manner a series of three different mixtures of regenerants were continuously extracted with various immiscible extractants using a laboratory liquid/liquid extractor. The apparatus was so designed that spent extractant was continuously distilled to provide fresh extractant which was reused and the non-volatile, unextracted regenerant concentrated in the distillation pot. The results are shown below. Repeated extractions are required to remove the bulk of the amine but the data indicates the feasibility and operability of the process.

available than low boiling chelates or acids used for regenerating the cation. Hence, in most instances a low boiling amine would be used in combination with the higher boiling cation regenerant, although the reverse, that is the use of a low boiling cation regenerant with a high boiling amine, will work equally as well. The process may be carried out in a variety of ways dependent upon the resins, regenerants and mineral salts to be precipitated. For example, if excess process water is removed prior to bringing the regenerant streams together as generally indicated in FIG. 1, salt precipitation will occur during the first step of combination of the two streams on or off stoichiometry. However, to maintain a balanced process, stoichiometry is preferred for the mineral ions.

However, if on the other hand, excess water is removed after the separation of the lower boiling amine regenerant, then salt precipitation will occur when the composition of the remaining cation regenerant is being concentrated.

Some examples of practice follow.

EXAMPLE 5

In this experiment, sodium lactate (boiling point lactic acid = 122°C at 4mm Hg pressure) was used as the spent cation regenerant and N,N-dimethylethylamine hydrochloride (boiling point N,N-dimethylethylamine = 37°C at 760mm Hg pressure) in methanolwater solution as the spent anion regenerant. The combined reagents simulating stoichiometric adjustment and the

TABLE 9

SEPARATION ANION AND CATION EXCHANGE REGENERANTS BY EXTRACTION OF THE ANION REGENERANT FROM AQUEOUS SOLUTION WITH AN IMMISCIBLE SOLVENT

I. Extraction by Agitation and Phase Separation

| Solvent | Cation Regenerant | Anion Regenerant | Time | Analysis, Normality | | | |
|---|---|---|---|---|---|---|---|
| | | | | Water Phase | | Solvent Phase | |
| | | | | Cation Reg. | Anion Reg. | Cation Reg. | Anion Reg. |
| Hexane | β-Methoxy-propionic acid | Trimethyl-amine | Initial Final | 0.99 0.99 | 1.05 0.85 | 0.00 0.00 | 0.000 0.201 |
| Benzene | β-Methoxy-propionic acid | Trimethyl-amine | Initial Final | 0.914 0.930 | 1.03 0.96 | 0.00 0.00 | 0.000 0.018 |
| II. Continuous Extraction (Laboratory Liquid Liquid Extractor) | | | | | | | |
| Benzene | β-Methoxy propionic acid | Pyridine | 0 hrs 2.5 hrs 6.0 hrs | 2.00 — 2.86* | 2.00 — 1.18 | 0.00 0.00 — | 0.000 0.758 1.500 |
| Hexane | β-Lactic acid | N-methyl-morpholine | 0 hrs 2.5 hrs | 1.89 — | 1.90 — | 0.00 0.00 | 0.000 0.025 |
| Diethyl ether | α-Lactic acid | Isopropanol-amine | 0 hrs 2.5 hrs | 1.01 — | 0.94 — | 0.00 0.00 | 0.000 0.007 |

*Increase in acid strength due to water removal by benzene.

Total separation cannot be achieved since there will always be a partition of each regenerant between the two media. Furthermore, with respect to the complexation, this requires the addition, separation and recovery of another chemical to the process which adds additional cost and complexity.

The subject matter of the technique of extraction separation is the subject matter of concurrently filed, copending application Ser. No. 496,484 Aug, 12, 1974 said disclosure being incorporated herein by reference.

For these reasons, the DISTILLATION technique is preferred as the method of regenerant for separation and recovery. All that is necessary is that one of the regenerants have a significantly lower boiling point than the other, suitably being separated by at least 10°F, preferably at least 25°F. In practice it is found that amines with lower boiling points are more readily presence of a residual sodium chloride heel from previous runs had the following composition:

| Compound | Wt, g | Moles |
|---|---|---|
| N,N-Dimethylethylamine | 13.2 | 0.18 |
| Lactic Acid | 16.0 | 0.18 |
| Methanol | 70.0 | |
| Water | 26.0 | |

The above solution was charged to the distillation pot of a 2 ft. packed distillation column and the amine removed by distillation using a 10/1 reflux ratio. Initially amine in a predominance of methanol was removed and finally amine and water. Analysis of the distillate and pot for amine by potentiometric titration after six hours showed 48% of the amine to have been removed in the distillate. Analysis of the pot and distillate for lactic acid accounted for all of the lactic acid and showed it to have remained in the distillation pot.

Separation of the amine from the ligand can be accomplished as previously indicated either by a phase separation technique or preferably by distillation.

Separation of the amine from the ligand can also be accomplished by a phase separation technique utilizing either miscible or immiscible solvents. Phase separation can be achieved by the proper selection of solvents for the regenerants which solvents are initially immiscible, wherein after the mixing step of the two regenerant solutions and the stoichiometric adjustment phase separation takes place automatically due to the chemistry involved. The ease of separation in phase separation is dependent upon the relative partition coefficients, and requires that the anion regenerant be substantially insoluble in the cation regenerant solvent and that the cation regenerant be substantially insoluble in the anion regenerant solvent. The selection of mutually immiscible solvents having the desired partition coefficient leads directly to distribution of the regenerants, one in each phase and to the precipitation of the mineral salt. The upper layer contains predominantly one of the regenerants for recovery and the lower layer contains substantially all of the other regenerant. The salt formed will be at least partially dissolved in the layer in which the salts have greatest solubility. Such phenomena are well understood in the art. Agitation of the mixture of the spent regenerant streams is preferred in order to increase contact of the spent regenerants to foster formation of the weak dissociable complex and to reconstitute the mineral salt. This technique is illustrated by the following example wherein the immiscible solvent systems are methanol-water, and normal heptane. In general practice because of the presence of water of hydration released from the resins, the salt will be found in the water containing layer, either in one of the two solvent layers or as a separate phase if neither of the solvents employed is water miscible.

Recovery of the individual regenerants from their solvent layers can be easily accomplished by known technique if required.

EXAMPLE 6

The spent cation regenerant solution (100 ml) was a methanol solution of the potassium chelate of 2-acetylcyclohexanone containing 1% potassium by weight and 2–5% water. This solution was combined with a spent anion regenerant solution comprised of the hydrochloric tri-n-octylamine in 100 ml n-heptane containing 1% chloride by weight. On combination and agitation a fine precipitate of potassium chloride formed and on standing, two separate layers. Infrared analysis of the upper layer after evaporation showed it to contain the amine with only a slight trace of any carbonyl compound. The lower layer was identified as methanol containing the β-diketone with a trace of amine.

An alternative extraction means utilizes one common solvent or miscible solvents in the regeneration step of the water demineralization process, as discussed previously herein, wherein the two streams are brought together. Subsequent extraction of one of the regenerants from the mixture of the streams is accomplished by treatment with a nonmiscible extractant. Thus, while the regenerants are both soluble in the common or miscible solvent system originally employed, upon the addition of the extractant, which has preferential solubility for only either the cation regenerant(s) or only the anion regenerant(s), one regenerant system will be separated out from the other. Ultimate removal of the now separated regenerant material from its separate layer can be accomplished by known techniques, as desired. Additional material describing this technique is presented elsewhere herein.

As indicated previously water accumulates in the regenerant system from dehydration of the resins during resing regeneration and from any washing steps employed. This water may be removed from the spent regenerants prior to mixing of the two streams, or later after separation and recovery of the regenerants. Removal of this excess water is beneficial to the maintenance of desired stoichiometry. An example of removal of water from a spent regenerant, prior to the mixing of the spent anion and cation regenerants is shown in Example 6A.

EXAMPLE 6A

A 750 ml volume of aqueous spent cation regenerant solution of lactic acid was combined with a water wash. The combined solution contained 0.41 vols of sodium lactate and 0.08 mols of free lactic acid and was concentrated by distillation of the water in a simple single plate still. The solution was concentrated to 114 ml and then rediluted to 150 ml with deionized water and analyzed to sodium lactate and free lactic acid by titration with hydrochloric acid followed by back titration with sodium hydroxide. The analytical results showed 0.41 mols of sodium lactate and 0.15 mols free lactic acid. The increase in lactic acid was attributed to hydrolysis of lactide impurity in the starting regenerant solution.

Separation of amine and chelating agent (liquid) by distillation is also enhanced by the use of a highly dissociated weak complex requiring again that either the amine be a relatively weak base and/or the liquid be a relatively weak acid. This separation is shown in the following example.

EXAMPLE 7

In the instant experiment, 1,3-cyclohexanedione, a chelating agent with an acidity approximately 1.5 orders of magnitude more weakly acidic than lactic acid, was used as the regenerating agent. To simulate the spent cation regenerant, 0.5 mols of 1,3-cyclohexanedione was treated with 0.2 mols of sodium hydroxide to give a 40% conversion to the sodium chelate. In addition, 30g of sodium chloride was added to simulate a salt heel from previous regeneration and recovery cycles. This composition was diluted to 250 ml with water containing 15% methanol.

The above spent cation regenerant solution was combined with a simulated spent anion regenerant solution containing 0.5 mols of N,N-dimethylethylamine, 0.2 mols of hydrochloric acid, 100 ml of methanol and diluted to 250 ml with deionized water.

Upon distillation using a single plate, i.e., directly into a condenser and receiver, approximately 75% of the amine was removed.

Referring again to the preferred distillation technique for separating a more volatile amine anion resin regenerant from a weakly acidic carboxylic acid cation resin regenerant, the complex separation process can be depicted according to the following formula:

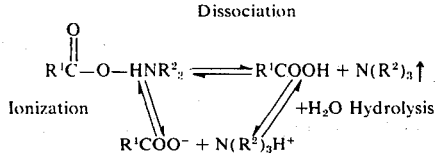

where R¹COOH is the cation resin regenerant and N(R²)₃ is the anion resin regenerant.

The amine carboxylate complex is a loosely bound compound which is partly associated and partly ionized. The amine and acid regenerant should have preferably narrow boiling point to ensure full removal and these boiling points and/or the boiling points of their respective azeotropes should be separated by at least 20°F in order to permit effective separation. The lower boiling regenerant or an azeotrope thereof, must have sufficient volatility so that it can be readily removed from the complex containing mixture while the higher boiling regenerant or its azeotrope should be essentially non-volatile or have very low volatility. This is desired in order to minimize carry over and contamination of the lower boiling regenerant. Any carried-over regenerant can be removed in a secondary distillation column to increase the efficiency of regeneration if desired.

Though separation need not proceed to completion, it is desirable to recover at least 70% of the amine to provide effective regeneration of the anion resin column. The cation regenerant will the contain 70% of the free acid and about 30% undissociated complex. Less excess regenerant and less energy input are required as the degree of separation of the complex is increased.

As previously discussed, there is always a compromise involved between regeneration optimization and separation efficiency. Stronger acids and bases are better regenerants but are more difficult to separate. Weaker acids and bases provide a better hydrolysis constant promoting separation but are poorer regenerants. The selection depends on the properties of the complex of the two regenerants. Satisfactory hydrolysis and dissociation is possible with the combination of a stronger base and weaker acid or weaker base and stronger acid.

The selection of the solvent for the regenerants is dependent upon resin characteristics; the regenerants and its choice influences the separation and recovery stage of the process. Alcohols such as methanol reduce the regeneration efficiency of available resins but facilitate precipitation and recovery of the reconstituted salt. Certain regenerants are more soluble in alcohol or alcohol-water mixtures. Suitable alcohols include methanol, ethanol, isopropanol, n-propanol, ethylene glycol, and other water miscible mono and polyhydric alcohols.

The solvent must be non-reactive with the regenerants throughout all stages of the regeneration of reecovery process. It has been found that certain chelating agents such as 1,3-cyclohexanedione are converted to an ether in the presence of methanol. This cation regenerant should only be utilized with water or an alcohol such as isopropanol which does not lead to ether formation.

Studies of the effect of methanol content on the completeness of regeneration of sodium loaded CC-3 cation exchange resin with a 3N solution of 1,3-cyclohexanedione (100% excess) show that the removal of Na+ ion is essentially quantitative with pure water and decreases slightly as the alcohol content is increased as shown in the following table.

TABLE 10

Effect of Methanol Content on Completeness of Regeneration of Na+ Loaded Duolite CC-3 Resin

| Theoretical Capacity of Column, equiv. | Na+ Loaded on Column at Start, equiv. | Methanol Content Regenerant, % vol. | Na+ Removed, % | Titratable Total 1,3-Cyclohexanedione Recovered, % |
|---|---|---|---|---|
| 0.5 | 0.45 | 0 | 100 | 93 |
| 0.5 | 0.45 | 3 | 98 | 91 |
| 0.5 | 0.45 | 10 | 91 | 85 |
| 0.5 | 0.45 | 20 | 87 | 81 |

NOTE: 1,3-Cyclohexanedione Concentration = ~ 3N

Nevertheless, very acceptable yields are achieved at methanol concentrations of from 10 to 20%. These are the low alcohol levels that are desirable to minimize ether formation. The rate of feed was kept very low in the above experiments to provide ample time for equilibration and diffusion of regenerants. Reduced recovery of a total ligand charged reflects possible variation in sampling technique (i.e., an approximate 5% loss was found as a result of poor drainage of the pipette, and no correction for this error is applied) and formation of the ether. If a 5% pipette drainage correction is applied, the recovery from pure water is 98%. The ether formed from methanol reaction does not titrate and, hence, though probably recovered, accounts for the reduced titratable recoveries shown in the last column.

The effects of ligand concentration on the completeness of the regeneration was also determined under the same conditions. The data obtained show that reducing the concentration appears to have little effect on the yield providing the amount of excess ligand remains the same.

Figure 6:
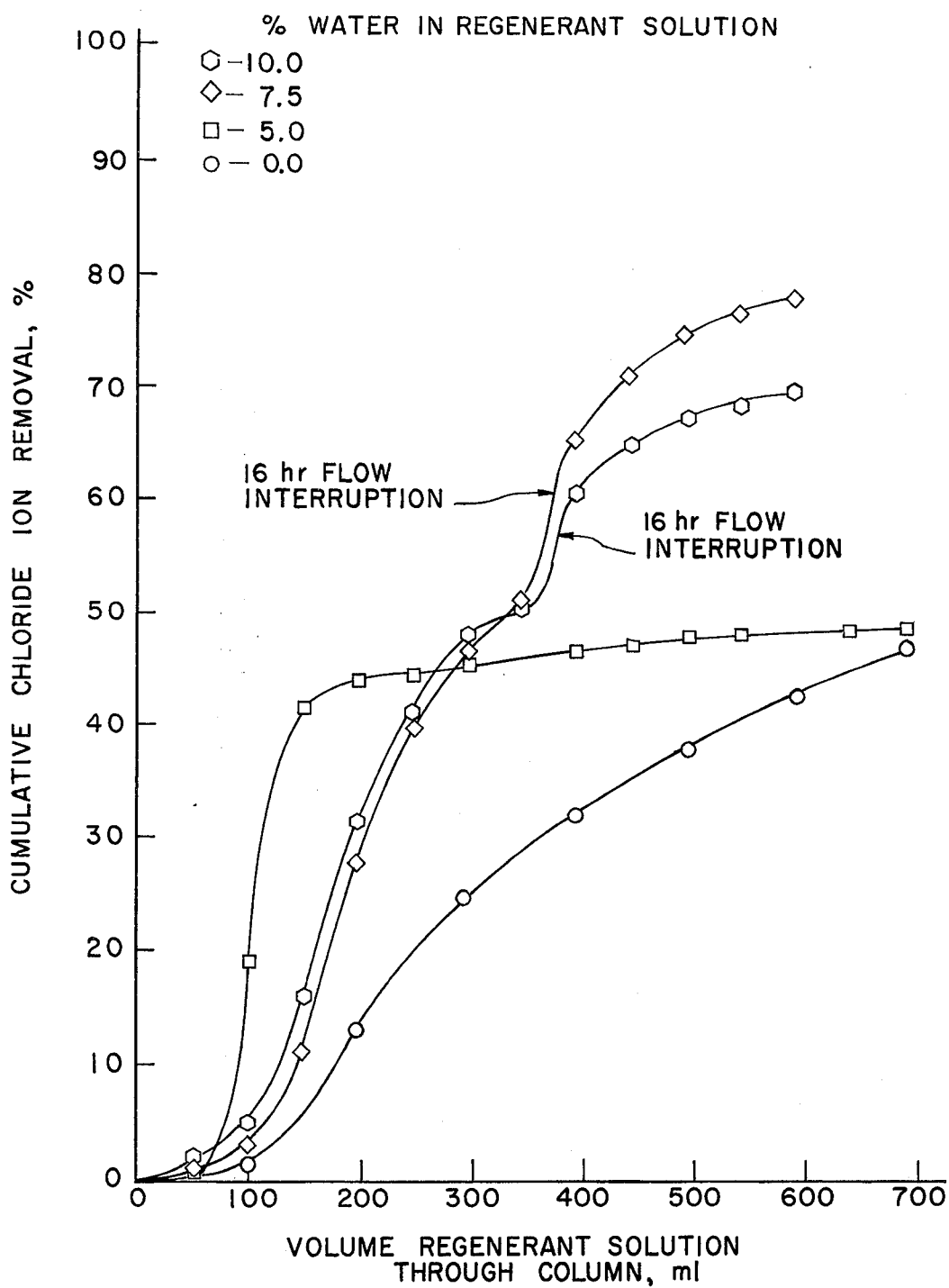
FIG. 6 is a graph illustrating chloride ion removal from Anion Resin ES-340 at different water levels.

The effect of water content of the 2N methanol solution of amine regenerant on the completeness of chloride removal was determined using chloride loaded Duolite ES-340 resin. The water concentration was varied from 0 to 10 volume %. The cumulative percent chloride ion removal as a function of regenerant charged is presented in FIG. 6. As indicated by the data, water concentrations of over 5% are required to achieve efficient regeneration.

In separate studies in which resin was treated with methanol containing various amounts of water, it was shown that a water concentration of at least 10% is required to prevent collapse of the resin as a result of dehydration.

Essentially, quantitative regeneration (97%) of chloride loaded ES-340 resin was subsequently achieved by draining the column and treating the resin in a backflow manner with a 100% excess of a 2N solution of the amine in methanol (10% water by volume). Similar results would have been obtained by a top-flow treatment.

The location of mineral salt recovery depends on the solvent and the place the solvent becomes a non-solvent for the mineral salt. As shown in FIG. 1, the mineral salt separation may occur in the regenerant combination step, if the solvent has a high alcohol content or if the excess water is removed from the spent regenerants before combination. Water requirements may also be decreased by modification of resin characteristics to prevent shrinkage or by utilizing a swelling agent other than water.

Figure 7:
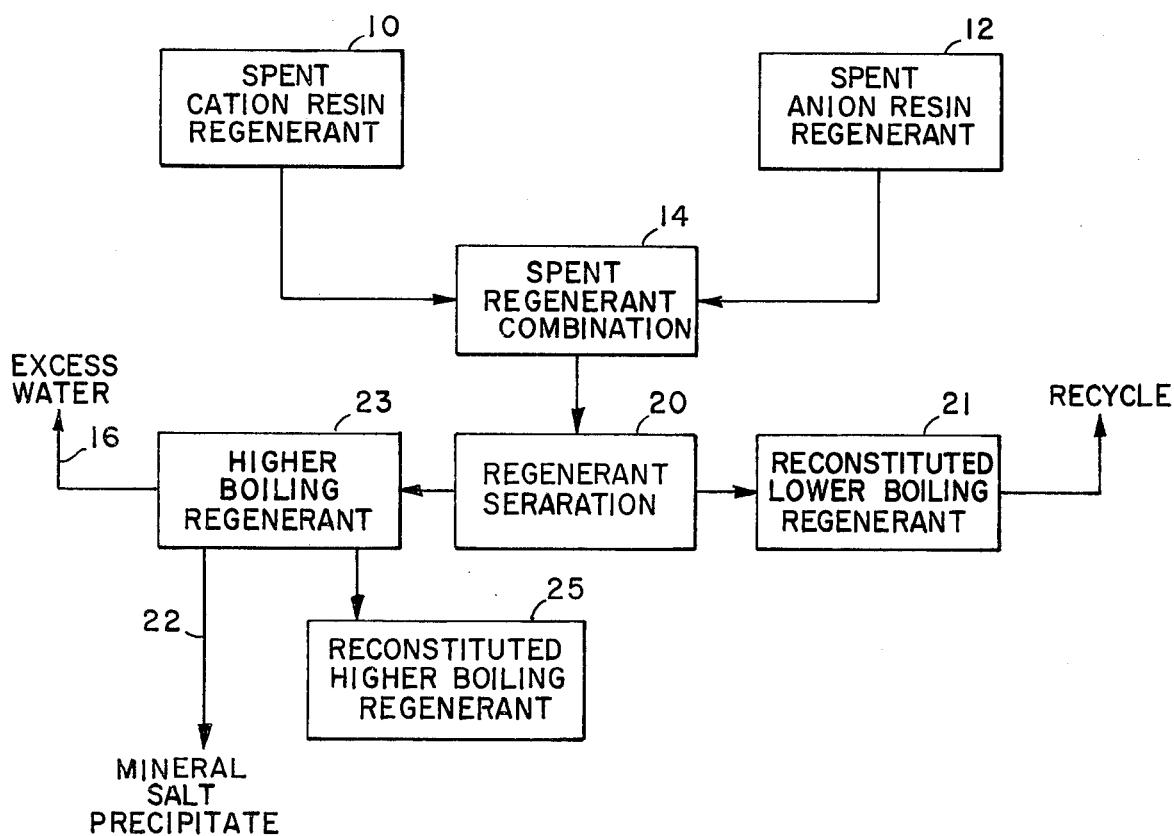
FIG. 7 is a block diagrammatic process flowsheet of the distillation recovery technique of the invention.

Referring now to FIG. 7, another embodiment is illustrated in which the excess water is removed after separation of the regenerants. The spent cation resin regenerant 10 and spent anion resin regenerant 12 are combined in vessel 14 in near stoichiometric ratio with respect to the mineral salt. The regenerant complex solution is separated in separator 20 by evaporating or distilling off the lower boiling regenerant such as the amine which is recovered and adjusted in concentration in tank 21 for recycle.

The higher boiling regenerant such as lactic acid is further concentrated in evaporator 23 to remove excess water via line 16 until the mineral salts precipitate and are recovered through line 22. The remaining higher boiling regenerant is adjusted in concentration in tank 25 for recycle to regenerate the cation resin column.

Figure 8:
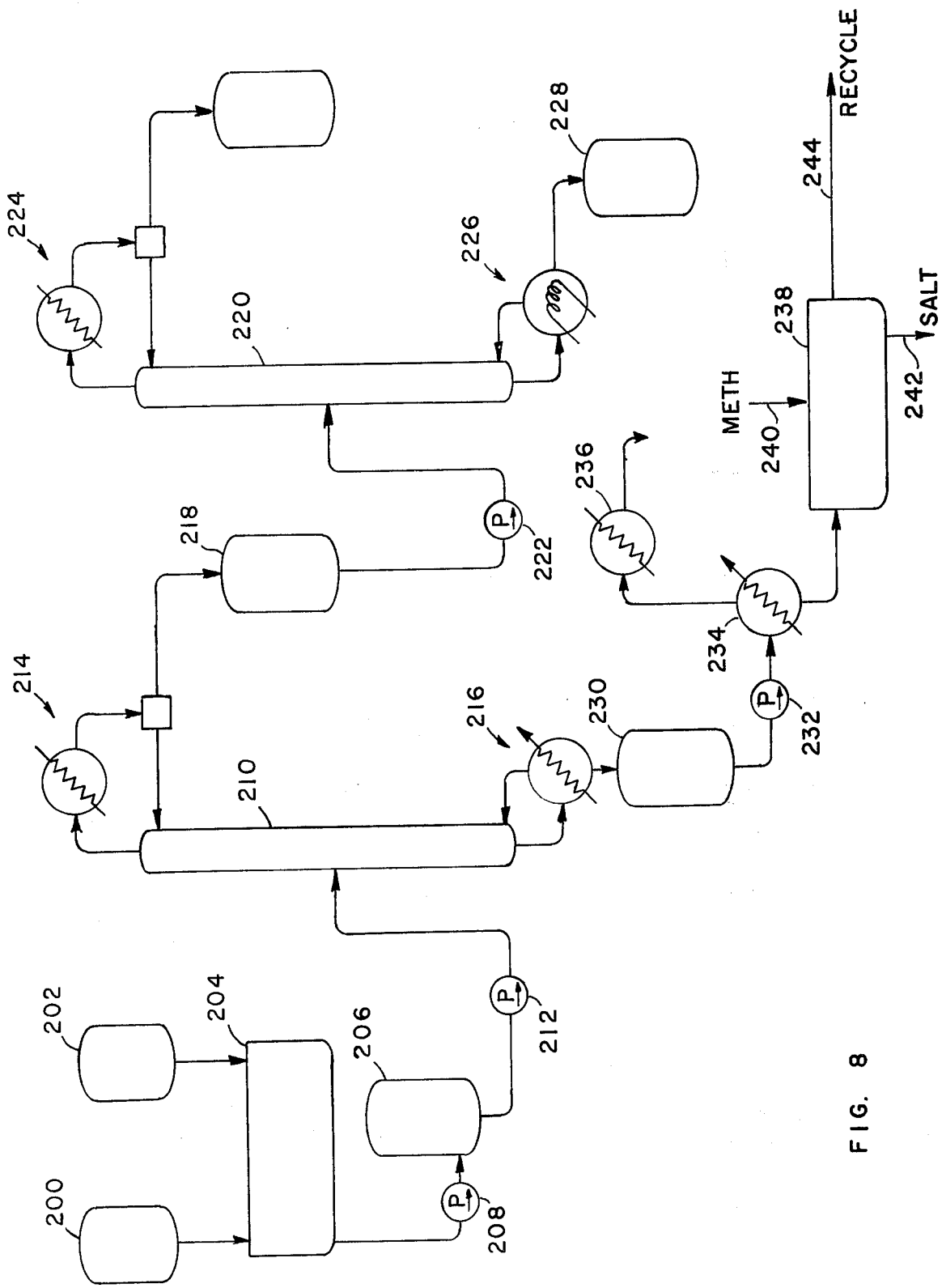
FIG. 8 is a schematic view of a distillation recovery apparatus.

Thoush a recovery system utilizing batch fractionating columns can be utilized, the rate of recovery of regenerants may differ and may not fit the requirement of resin regeneration demands. A continuous recovery system suitable for use with a methanol-water solvent system is illustrated in FIG. 8. The recovery system has an anion holding tank 200 and a cation holding tank 202 capable of accepting and holding the cyclic discharge of the resin regenerant effluents. The anion/cation effluents are mixed in spent regenerant neutralization tank 204 to an end point that frees the anion regenerant such as the amine and the cation regenerant such as the acid from their respective complexes with the cation and anion of the mineral salt. This step will be pH controlled in the tank 204. The stoichiometrically adjusted mixture containing the regenerant chemicals to be recovered, dissolved salt to be disposed of and the excess water to be removed is batch fed to a surge tank 206 by means of pump 208 and from there fed continuously to a first fractionating tower 210 by means of pump 212. The tower 210 has a rectifying section 214 that produces a solution of amine and methanol in water and a stripping section 216 that produces a solution of acid and salt in water. The amine-methanol solution collects in tank 218 and is fed to second rectifying column 220 by means of pump 222.

The second column 220 produces a water deficient reconstituted anion regenerant solution as the overhead from rectifying section 224 and yields a methanol rich water solution as the bottoms product from stripping section 226. The methanol-water solution is collected in tan 228 and with the addition of water is reconstituted to the appropriate concentration as the methanol-water wash solution required in the regeneration steps.

The bottoms product from the first column collects in tank 230 and is fed by pump 232 to an evaporator 234. The evaporator removes the required water from the overhead which is condensed by condenser 236. The bottoms product is a salt rich, methanol deficient, cation regenerant solution which is cooled in vessel 238. When methanol makeup is added through line 240, the excess salt precipitates and is removed through line 242. A fully reconstituted cation regenerant solution ready for use after precipitate removal is removed through line 244 for recycle.

Preliminary heat balance at 10,000 gpd indicate that this recovery system can operate at energy demands lower than 187 lb. of 30 psig steam per 1,000 gallons of process water at 700 ppm NaCl and 30 kw electrical power per 1,000 gallons. At energy costs of $0.25/1,000 lb. steam and $0.02/kw hour, the total energy cost is about $0.107/1,000 gallon water process containing 700 ppm NaCl. Because normal industrial energy costs about one-half the rates quoted, the energy cost at a small scale to large industry would be less than $0.05/1,000 gallons.

Figure 9:
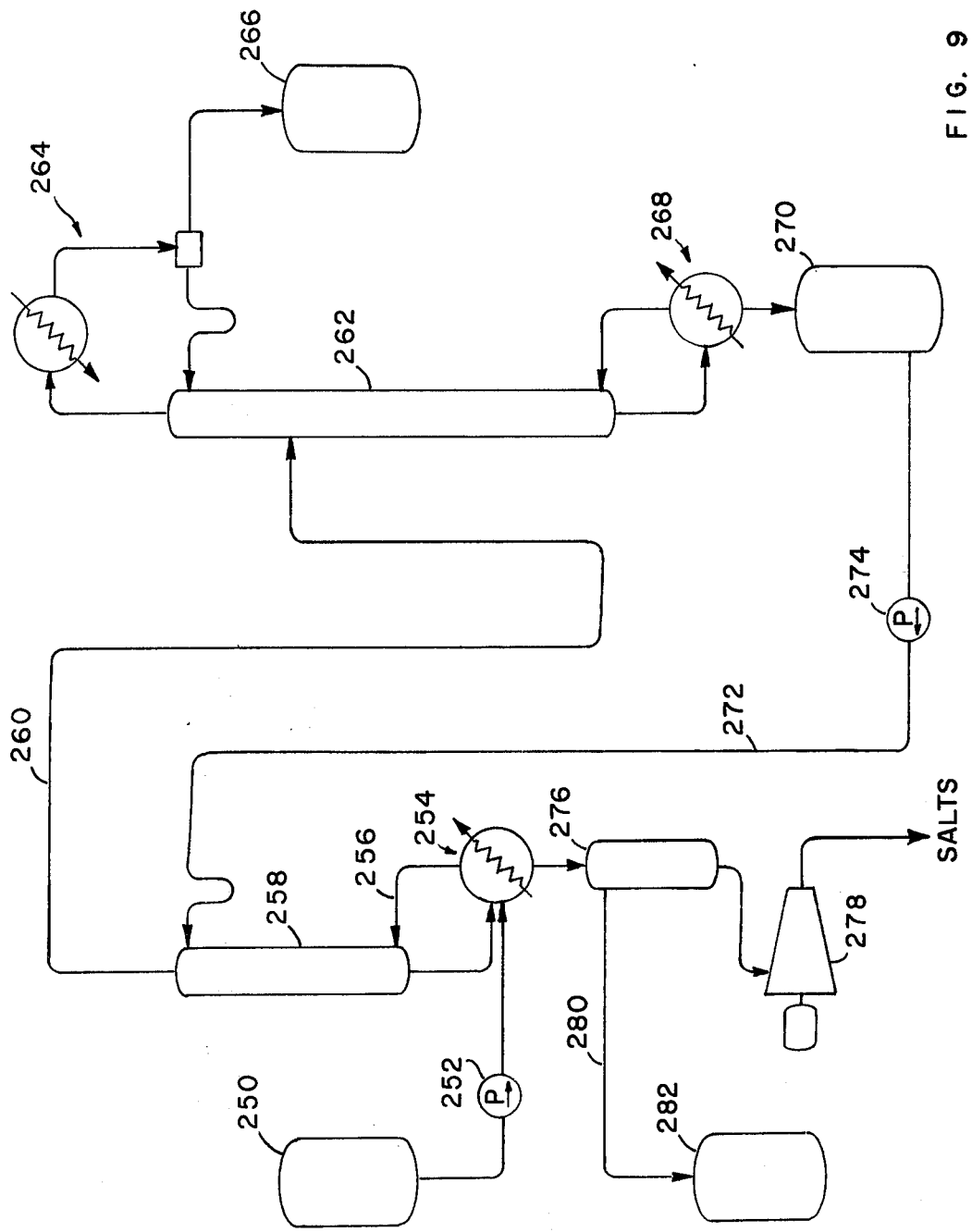
FIG. 9 is a schematic view of a further embodiment of a distillation recovery system in accordance with the invention.

The recovery system is simplified by eliminating methanol as a required constituent of both the cation and anion regenerant solutions. Such a system is shown in FIG. 9. The mixture in spent regenerant tank 250 is fed by means of pump 252 to evaporator 254. The overhead product consisting of an aqueous solution of amine is fed by line 256 to rectifying column 258. The rectifying column 258 can be eliminated if a suitable high boiling regenerant having good thermal stability is utilized. The overhead from the rectifying column is delivered through line 260 to a distillation column 262 containing a rectifying section 264. The amine is recovered as an overhead product and collects in tank 266 and the excess water and makeup water are recovered as a bottom product from stripping section 268 in makeup water tank 270. Makeup water is pumped through line 272 by means of pump 274 to the rectifying column 258. The bottom product from evaporator 254 consisting of the solution of cation regenerant and mineral salts in water is concentrated in concentrator 276 and the waste solids removed through centrifuge 278 while the cation regenerant is recovered as an overhead through line 280 and collects in supply tank 282 for recycle to the cation resin column.

The effect of loading level on the regeneration requirements for cation exchange resins such as Duolite CC-3 resin loaded with calcium ion and regenerated with MOPA is presented in Table 11 below.

TABLE 11

EFFECT OF LOADING LEVEL ON THE REGENERATION REQUIREMENTS FOR CATION EXCHANGE RESINS.
(DUOLITE CC-3 RESIN, LOADED WITH CALCIUM, MOPA REGENERANT)

| LOADING % OF THEORETICAL | CONC. REGEN. SOLUTION, N | STOICHIOMETRY OF REGEN. CHANGE, % OF $CA^{++}$ LOAD | FLOW RATE, ml/MIN. | REGENERATION YIELD, % |
|---|---|---|---|---|
| 70 | 1 | 300[1] | 1 | 94 |
| 40.5 | 0.5 | 200[2] | 1.5 | 68 |
| 38 | 1 | 200[2] | 0.5 - 1 | 66 |

TABLE 11-continued

EFFECT OF LOADING LEVEL ON THE REGENERATION REQUIREMENTS
FOR CATION EXCHANGE RESINS.
(DUOLITE CC-3 RESIN, LOADED WITH CALCIUM, MOPA REGENERANT)

| LOADING % OF THEORETICAL | CONC. REGEN. SOLUTION, N | STOICHIOMETRY OF REGEN. CHANGE, % OF CA$^{++}$ LOAD | FLOW RATE, ml/MIN. | REGENERATION YIELD, % |
|---|---|---|---|---|
| 28.5 | 1 | 610[1] | 1 | 100 |

[1]Profile technique of regeneration.
[2]Standard regeneration with wash.
MOPA = β-methoxypropionic acid This data shows that very high levels of regeneration at 50% stoichiometric excess is achieved when a relatively high sodium chloride heel (7.6%) is present as a contaminant. However, when high residues of TMA are present in the regeneration stream, 40% or more significant quantities of TMA remain on the column as a substituent ion. Such a residue would appear later as contaminant in the product water and result in a significant loss of regenerant. In laboratory and pilot plant scale tests of the separation of TMA from the TMA lactate complex indicated that for the selected regenerants 70% amine removal appears to be an upper limit. Average operation would indicate removal on the order of 50%. A method of overcoming this difficulty has been successfully tested. This constitutes maintaining a 25% alkali or alkaline earth metal heel on the cation regenerant. Such an imbalance results in excellent amine separation. At the same time the metal is the residue which is left on the cation column. Although this reduces the efficiency of the cation column, the presence of a metal, e.g. sodium, would not contaminate the product water nor would this cause a serious loss of regenerant. Regeneration of a sodium loaded cation column with β-lactic acid (100% stoichiometric as excess lactate ion) resulted in a 92.1% removal of sodium ion with 100% recovery of the β-lactic moiety.

The above technique of using an excess of sodium or other metal ion to reduce the amine residue is limited by the fact that the amine deposits on the resin, because it moves down the column more slowly. Hence, regardless of the degree of imbalance, some residue of amine will remain due to this difference in rate of travel. Even adding the metal cation regenerant incrementally does not solve the problem because of the presence of a small amount of amine contaminant in the regenerant itself. Thus, one could only tend to go toward reaching a progressively smaller amine residue without actual achievement of complete removal. Thus recycling will not achieve the desired result. However, a secondary treatment of post introduction on the toe of the resin with an inorganic metal salt solution (free of contaminants) will act to displace completely the amine heel on the resin. Such post treatment metal salt can have its metal ion the same or different from that present in the cation regenerant. The negative ion so long as it does not form complexes or insoluble products can be any negative ion, inorganic or low molecular weight organic such as formate. When this technique of post treatment is employed, the use of an imbalanced system is not required but may be utilized. Experimentation has shown that post treatment salt concentrations of the order of 5,000 to 10,000 ppm and in stoichiometric excess over the amount of amine residue should be employed to give the best results.

Summary of the pilot plant tests with TMA-β-lactate system on continuous runs is shown in the following table.

TABLE 12

SUMMARY OF PILOT PLANT TESTS
TMA - β-Lactate System
(Continuous Runs)

| Feed Composition | | Distillate Composition | Reboiler Composition | | |
|---|---|---|---|---|---|
| Lactate | Free Amine | Free Amine | Lactate | Free Acid | % Dissociate |
| FEEDING NEUT. REGEN. SOLUTION TO DISTILLATION COLUMN | | | | | |
| 0.28N | .05N | 1.57N | 0.45N | 0.12N | 25.6 |
| 2.5 wt% | 0.3 wt% | 9.55 wt% | 4.06 wt% | 1.04 wt% | |
| FEEDING NEUT. REGEN. SOLUTION TO EVAPORATOR | | | | | |
| 0.28N | .05N | 0.33N | 4.8N | 2.5N | 52.1 |
| 2.5 wt% | 0.3 wt% | 2.0 wt% | 39 wt% | 20 wt% | |
| FEEDING CONCENTRATED NEUT. REGEN. SOLUTION TO EVAPORATOR | | | | | |
| 1.36N | 0.12N | 0.7N | 4.5N | 2.4N | 63.3 |
| 12 wt% | 0.7 wt% | 4.1 wt% | 37 wt% | 20 wt% | |
| FEEDING AMINE SOLUTION TO EVAP. AS CK ON EQUILIBRIUM | | | | | |
| 0.01N | 0.7N | 0.7N | 7.5N | 5.3N | 70.7 |
| Trace | 4.0 wt% | 4.0 wt% | 60 wt% | 42 wt% | |

A list of the pertinent physical properties of ingredients useful in the system of the invention are provided in the following table.

TABLE 13

PHYSICAL PROPERTY DATA

| Description | M.W. | $\rho 20°C$ g/cc | $\mu 20°C$ g/cm-sec | at in B.P. °C | M.P. °C |
|---|---|---|---|---|---|
| Methanol (MeOH) | 32.04 | 0.7914 | — | 65.0 | −93.9 |
| β-methoxypropanoic acid (MOPA) | 104.10 | 1.105 | 8.7 | 102 at 10mm Hg | liq. |
| N-methylmorpholine | 101.15 | 0.9051 | | 115 | liq. |
| Sodium Methoxypropanoate | 126.08 | — | Solid | — | — |

TABLE 13-continued

PHYSICAL PROPERTY DATA

| Description | M.W. | $\rho 20°C$ g/cc | $\mu 20°C$ g/cm-sec | at in B.P. °C | M.P. °C |
|---|---|---|---|---|---|
| Trimethylamine (TMA) | 59.11 | 0.662 | ~0.3 | 2.9 | −117.2 |
| TMA·MOPA | 163.21 | — | Solid | — | — |
| Spent Anion Regen. (TMA sol'n) | — | 1.003 | 0.92 | — | — |
| Spent Cation Regen. (recycled MOPA sol'n) | — | 1.043 | — | — | — |
| Anion Regen. (2.15N TMA) | — | 0.963 | 1.86 | — | — |
| Mixed Spent Regenerants Recited | — | 1.020 | — | — | — |
| Recovery MOPA sol'n) (5.5N) | — | 1.139 | 8.4 | — | — |
| Cation Regenerant (2N MOPA) | — | 1.033 | — | — | — |
| Dimethylethanolamine | 89.14 | 0.887 | — | 133.5 | — |
| β-Lactic Acid | 90.08 | 1.449 | — | Decomposes | — |
| Recovered MOPA sol'n (2.5N) | — | 1.056 | — | — | — |

A pilot plant as shown in FIG. 9 capable of processing 1,000 gallons per day of waste water was operated as follows. The ion-exchange system consisted of a series of cation-anion resin bed sets identified as the carousel fixed beds buffered system as disclosed in application Ser. No. 476,835, entitled Buffered, Weak, Ion-Exchange Water Demineralization Process, filed June 6, 1974. The resins were CC-3 cation resins, IRA-68 anion resins, N-methylmorpholine as buffer at 40% of theoretical cation capacity, trimethylamine (2N) as anion regenerant and β-methoxypropionic acid (2N) as cation regenerant.

The resin columns are all 6 inches inside diameter, the cation resin columns are loaded to a 27-inch bed depth (fully regenerated) with 0.442 cubic foot of CC-3 resin (54 g-eq theoretical capacity); the anion resins are loaded to a 54-inch bed depth (fully regenerated) with 0.884 cubic foot of IRA-68 resin (38.5 g-eq theoretical capacity). Eight columns were provided in five sets. The loading capacity of the lead anion resin column would be reached between 19 and about 29 hours with the system reducing 500 ppm in NaCl feed to water containing below 2 ppm NaCl with the column loaded to a level of 40%. Highest purity water is achieved when the ion beds have been essentially 100% regenerated. The anion resin is completely regenerated by using a 2N trimethylamine solution containing a 35% excess of regenerant; excess beyond a stoichiometric amount of anion loaded on the resin. The recycled cation regenerant composition is considerably more complex. The composition used successfully for regeneration is: 2.5 N MOPA acid, 0.8N TMA-MOPA acid salt, 0.4N sodium chloride, and 0.15N of unidentified ionized chlorides or chlorinated compounds. When the sodium chloride concentration approaches 0.8N and the TMA-MOPA nears 1.7N, the regeneration efficiency drops below 100%, sodium removal and cation bed performance suffers. The data demonstrates that with the use of TMA and MOPA as the regenerants, dissociation approaching 80% are regularly obtained at evaporator temperatures of 250°F. At current ion-exchange loadings of 35% of theory, the regenerant recovery load is 0.1 gallon spent regenerant for every gallon of water at 1,000 ppm NaCl processed. By increasing the ion-exchange loading to 70%, this load will be reduced almost inversely to 0.05 gallons regenerant per gallon process water at 1,000 ppm NaCl. This reduction results since the wash water represents the bulk of the spent regenerant volume and remains essentially constant regardless of ion bed loading. In addition, the cation regenerant volume remains constant since less excess regenerant is required as loading increases.

It is to be realized that only preferred embodiments of the invention have been described, and that numerous substitutions, alterations and modifications are all permissible without departing from the spirit and scope of the invention as defined in the following claims.

What is claimed is:

1. A method of recovering and recycling spent ion-exchange regenerants comprising the steps of:
  1. passing through a first, separate bed of spent, weakly-basic, anion exchange resin containing bound inorganic anion, X, a weak organic base anion regenerant, $R_a$, to regenerate said resin and to form a first effluent stream containing spent anion regenerant of the formula, $R_aX$;
  2. passing through a second, separate bed of spent, weakly acidic cation exchange resin containing bound inorganic cation, M, a cation regenerant, $R_c$, selected from organic complexing agents for the inorganic cation, M, and weakly acidic organic carboxylic acids to regenerate said resin and to form a second effluent stream containing spent cation regenerant of the formula, $MR_c$;
  3. combining said first stream containing spent anion regenerant, $R_aX$, with said second stream containing spent cation regenerant, $MR_c$, to form a mixture containing a strongly dissociated, ionizable complex, $R_c R_a$, and reconstituted inorganic salt, MX;
  4. dissociating the complex to free $R_c$ or $R_a$ regenerant;
  5. separating one of the regenerants from the mixture and recycling it to one of said beds; and
  6. separating the remaining regenerant from the mixture and recycling it to the other of said beds.

2. A method according to claim 1 in which the first and second streams are combined in a manner to sotichiometrically adjust the amount of $MR_c$ combined with $R_aX$ such that MX is formed in the mixture.

3. A method according to claim 1 further including the step of removing said salt from the mixture.

4. A method according to claim 3 in which the concentration of the salt is increased until it precipitates from the mixture.

5. A method according to claim 4 in which the concentration step is effected on the residue of the mixture after separation of one of said regenerants therefrom.

6. A method according to claim 1 in which each of the streams contain at least 5% by weight of water.

7. A method according to claim 6 further including the step of reducing the amount of water in at least one of said streams before they are combined.

8. A method according to claim 6 further including the step of reducing the concentration of water in the mixture.

9. A method according to claim 1 further including the step of adjusting the concentration of the separated regenerants before recycling them to regenerate spent ion-exchange resin beds.

10. A method according to claim 1 in which the recycled regenerant is provided in at least a 30% stoichiometric excess with respect to ion loading of the ion-exchange resin bed.

11. A method according to claim 10 in which said excess is from 50–200%.

12. A method according to claim 1 in which the pK of the regenerants is between 5 and 7.

13. A method according to claim 12 in which the anion regenerant is a weak organic base having a pK magnitude at least 2 more basic than the anion resin.

14. A method according to claim 13 in which the anion regenerant is an amine having a molecular weight below 500.

15. A method according to claim 14 in which the amine regenerant is selected from compounds of the formula:

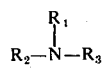

where $R_1$, $R_2$ and $R_3$ are selected from hydrogen, alkyl, alkynyl, alkenyl, aryl, alkaryl, aralkyl, alkoxy and may be substituted with hereto atoms or groups such as hydroxyl, ether, halogen, cyano; or $R_2$ and $R_3$ may be linked to form a cycloaliphatic structure.

16. A method according to claim 15 in which the amine is selected from the group consisting of N,N-dimethylethylamine, trimethylamine, dimethylamine, pyridine, N-methylmorpholine, N,N-dimethyl-2-methoxyethyl amine, isopropanol amine, tri-n-octyl amine, tri-n-decyl amine, N,N-diethylmethylamine, triethylamine and dimethylethanol amine.

17. A method according to claim 1 in which said inorganic cation complexing agents form organic soluble chelates and are selective toward the metal M.

18. A method according to claim 17 in which the chelates are selected from diketones, esters, amides, nitrocompounds, amines, amine acids, hydroxyl compounds and combinations thereof capable of enol formation and complexation with metal ions to form chelates.

19. A method according to claim 18 in which the chelates are selected from nitrodiphenylamines and β-diketones having a single exchangeable hydrogen.

20. A method according to claim 19 in which the chelate is 2-acetylcyclohexanone.

21. A method according to claim 3 in which separation is accomplished by distilling one of said regenerants from the mixture and one of said regenerants is substantially more volatile than the other.

22. A method according to claim 21 in which the boiling point of the more volatile regenerant is at least 10°F less than the other regenerant.

23. A method according to claim 22 in which the more volatile regenerant is an amine anion resin regenerant and at least 80% of the amine is separated and recovered.

* * * * *